US009130892B2

(12) United States Patent
Singh et al.

(10) Patent No.: US 9,130,892 B2
(45) Date of Patent: Sep. 8, 2015

(54) MULTIMEDIA COLLABORATION IN LIVE CHAT

(75) Inventors: Amit Singh, Irving, TX (US); Chad E. Young, Allen, TX (US); Minbao Li, Lewisville, TX (US); Tarun Jindal, Irving, TX (US); Mark Studness, Basking Ridge, NJ (US); Roopa Kotha, Irving, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 141 days.

(21) Appl. No.: 13/532,363

(22) Filed: Jun. 25, 2012

(65) Prior Publication Data
US 2013/0346885 A1 Dec. 26, 2013

(51) Int. Cl.
*G06F 3/048* (2013.01)
*G06F 15/16* (2006.01)
*G06F 17/20* (2006.01)
*G06F 17/30* (2006.01)
*G06F 17/00* (2006.01)
*G06F 3/01* (2006.01)
*H04L 12/58* (2006.01)
*G06Q 30/00* (2012.01)
*H04L 12/18* (2006.01)

(52) U.S. Cl.
CPC ............... *H04L 51/04* (2013.01); *G06Q 30/01* (2013.01); *H04L 12/1813* (2013.01); *H04L 51/10* (2013.01)

(58) Field of Classification Search
CPC ..................................................... G06F 3/048
USPC ......................................... 715/751, 753, 758
See application file for complete search history.

(56) References Cited

U.S. PATENT DOCUMENTS

| 2002/0194272 A1* | 12/2002 | Zhu .............................. 709/204 |
| 2005/0131764 A1* | 6/2005 | Pearson et al. .................. 705/26 |
| 2007/0038458 A1* | 2/2007 | Park .............................. 704/270 |
| 2008/0091829 A1* | 4/2008 | Spataro et al. ................ 709/227 |
| 2008/0320568 A1* | 12/2008 | Hawkins et al. .................. 726/5 |
| 2009/0161838 A1* | 6/2009 | Schultz et al. ............. 379/88.04 |
| 2009/0164581 A1* | 6/2009 | Bove et al. .................... 709/205 |
| 2011/0238531 A1* | 9/2011 | Sang et al. ................. 705/26.61 |
| 2011/0261947 A1* | 10/2011 | Benefield et al. ........ 379/265.09 |
| 2011/0282686 A1* | 11/2011 | Venon et al. ...................... 705/3 |

(Continued)

OTHER PUBLICATIONS

Makoto Kobayashi et al, Collaborative Customer Services Using Synchronous Web Browser Sharing, 1998, ACM, Conference Paper, 99-108;xii+434.*

(Continued)

*Primary Examiner* — Jennifer To
*Assistant Examiner* — Hugo Molina

(57) ABSTRACT

A system may initiate a chat session between a first user device and a second user device, may receive a desired attribute associated with a multimedia item, and may provide information associated with multimedia items based on the desired attribute. The system may receive a selection of information associated with a multimedia item, may provide the multimedia item to the first user device based on the selection, and may enable the first user device to share the multimedia item with the second user device via the chat session. The system may receive an annotation to the multimedia item to generate an annotated multimedia item, and may enable the first user device and the second user device to share the annotated multimedia item via the chat session.

19 Claims, 17 Drawing Sheets

(56) References Cited

U.S. PATENT DOCUMENTS

2012/0054176 A1* 3/2012 Chung et al. .................. 707/722
2012/0101913 A1* 4/2012 Ferrara et al. ................ 705/26.5
2012/0233534 A1* 9/2012 Vanderwende et al. ...... 715/230
2012/0240057 A1* 9/2012 Bassemir et al. ............. 715/752
2012/0260195 A1* 10/2012 Hon et al. ..................... 715/753
2013/0198600 A1* 8/2013 Lockhart et al. .............. 715/230
2013/0307997 A1* 11/2013 O'Keefe et al. ............ 348/207.1
2013/0311947 A1* 11/2013 Tsai et al. ..................... 715/815

OTHER PUBLICATIONS

Technique for Annotating a Document Page, Mar. 1, 1992, IBM Technical Disclosure Bulletin, Mar. 1992, US, 34, p. 53-54.*

* cited by examiner

| Multimedia Item Identifier 510 | Description 520 | Keywords 530 | Author 540 | Creation Date 550 | Last Access Date 560 | Quantity of Accesses 570 | Agent Rating 580 | Customer Rating 590 |
|---|---|---|---|---|---|---|---|---|
| PhoneAA.img | Image of Phone Model AA | Phone, Model AA | Smith | May 14, 2012 | May 14, 2012 | 2 | B | A |
| Voicemail5.aud | Audio of a sample voicemail message | Voicemail | Jones, Smith | 6/30/08 | 9/30/09 | 50 | 10 | 10 |
| ServiceFiOS.vid | Video for setting up FiOS Service | FiOS, Setup | M. Brown | 2006-07-04 | 2010-05-11 | 17 | C | D |
| PhoneBB.int | Interactive content for Phone Model BB | Phone, Model BB | David Davis | 3-3-2011 | 3-5-2011 | 1 | + | - |

MULTIMEDIA COLLABORATION IN LIVE CHAT

BACKGROUND

Customer support for products and services, such as telecommunications products and services, may be provided through web-based interactions between customers and customer service agents, such as via live chat. For example, a customer may initiate a chat session with a customer service agent in order to seek a solution to a problem that the customer is experiencing with a product or a service.

BRIEF DESCRIPTION OF THE DRAWINGS

FIG. 5 is a diagram of an example data structure that stores information associated with multimedia items and multimedia item attributes;

DETAILED DESCRIPTION OF PREFERRED EMBODIMENTS

The following detailed description of example embodiments refers to the accompanying drawings. The same reference numbers in different drawings may identify the same or similar elements.

During web interactions, such as live chat sessions, agents and customers may become frustrated by their lack of ability to communicate problems or solutions using text or voice. For example, a customer may want to point out a problematic component of a device or share a screenshot of a problematic device. As another example, agents may want to guide users through a series of screenshots to help customers resolve problems. Customers and agents may want to share a variety of multimedia items, such as images, audio, video, animations, etc., in order to more effectively communicate problems and solutions.

Implementations described herein may decrease frustration experienced by agents and customers when communicating by web interactions. This may be achieved by allowing agents and customers to share and/or annotate multimedia items in order to more effectively communicate problems and/or solutions.

Figure 1:
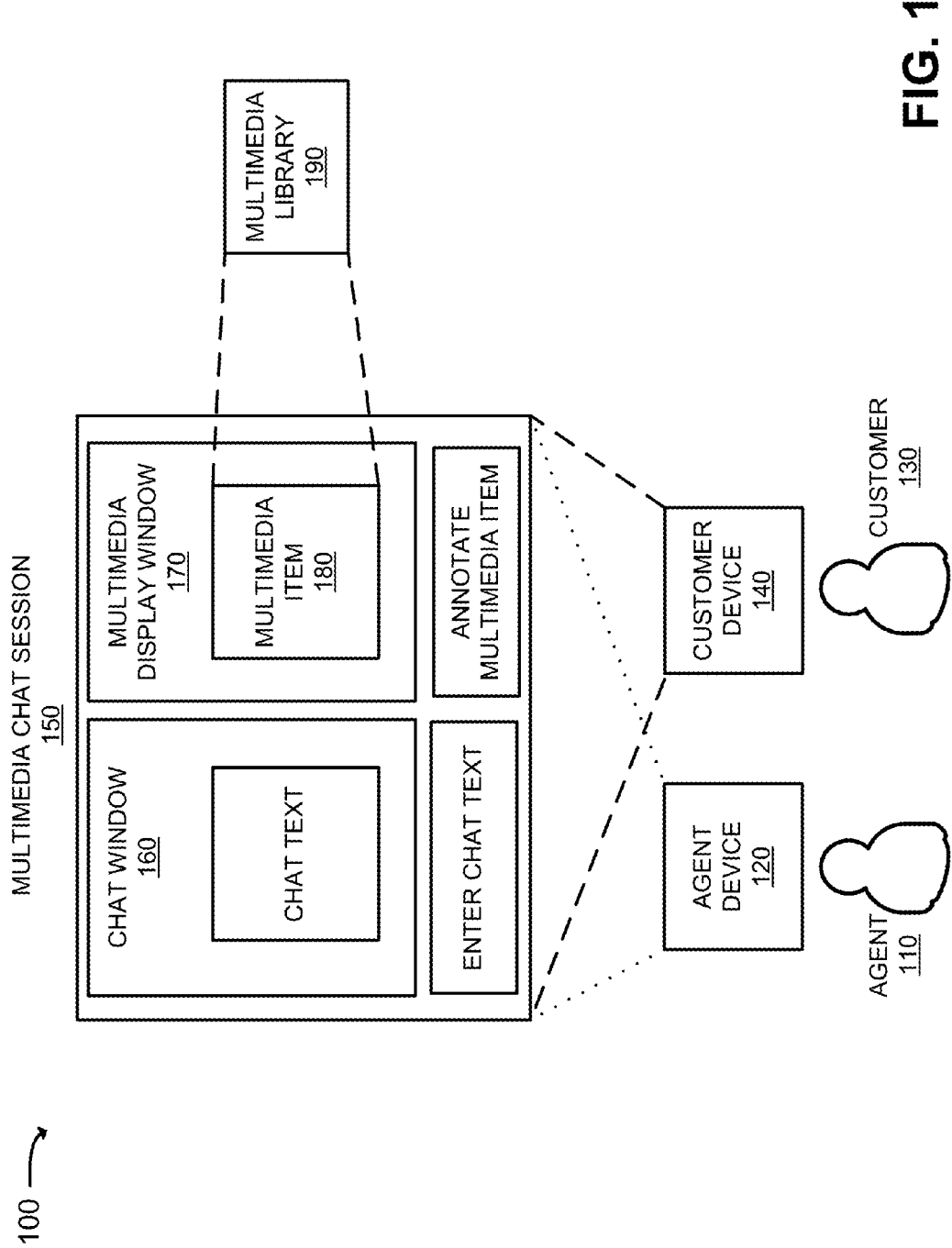
FIG. 1 is a diagram of an overview of an implementation described herein.

FIG. 1 is a diagram of on overview 100 of an implementation described herein. As illustrated in FIG. 1, an agent 110 may be associated with an agent device 120, and a customer 130 may be associated with a customer device 140. Agent 110 and customer 130 may use their respective devices to communicate via a multimedia chat session 150. Multimedia chat session 150 may allow agent 110 and customer 130 to use their respective devices to communicate using text in a chat window 160. For example, agent 110 may enter chat text via chat window 160, and the entered text may be displayed to agent 110 and customer 130 via chat window 160. Multimedia chat session 150 may also allow agent 110 and customer 130 to use their respective devices to communicate a multimedia item 180 (e.g., images, audio, video, animations, etc.) for display in a multimedia display window 170. Agent 110 and/or customer 130 may select multimedia item 180 to display in multimedia window 170 by accessing a multimedia library 190.

Multimedia chat session 150 may allow agent 110 and/or customer 130 to annotate a selected multimedia item 180 and share the annotation with each other. For example, agent 110 may annotate multimedia item 180 (e.g., by adding text, an image, etc.) via multimedia display window 170, and the annotation may be displayed to agent 110 and customer 130 in multimedia display window 170.

Figure 2:
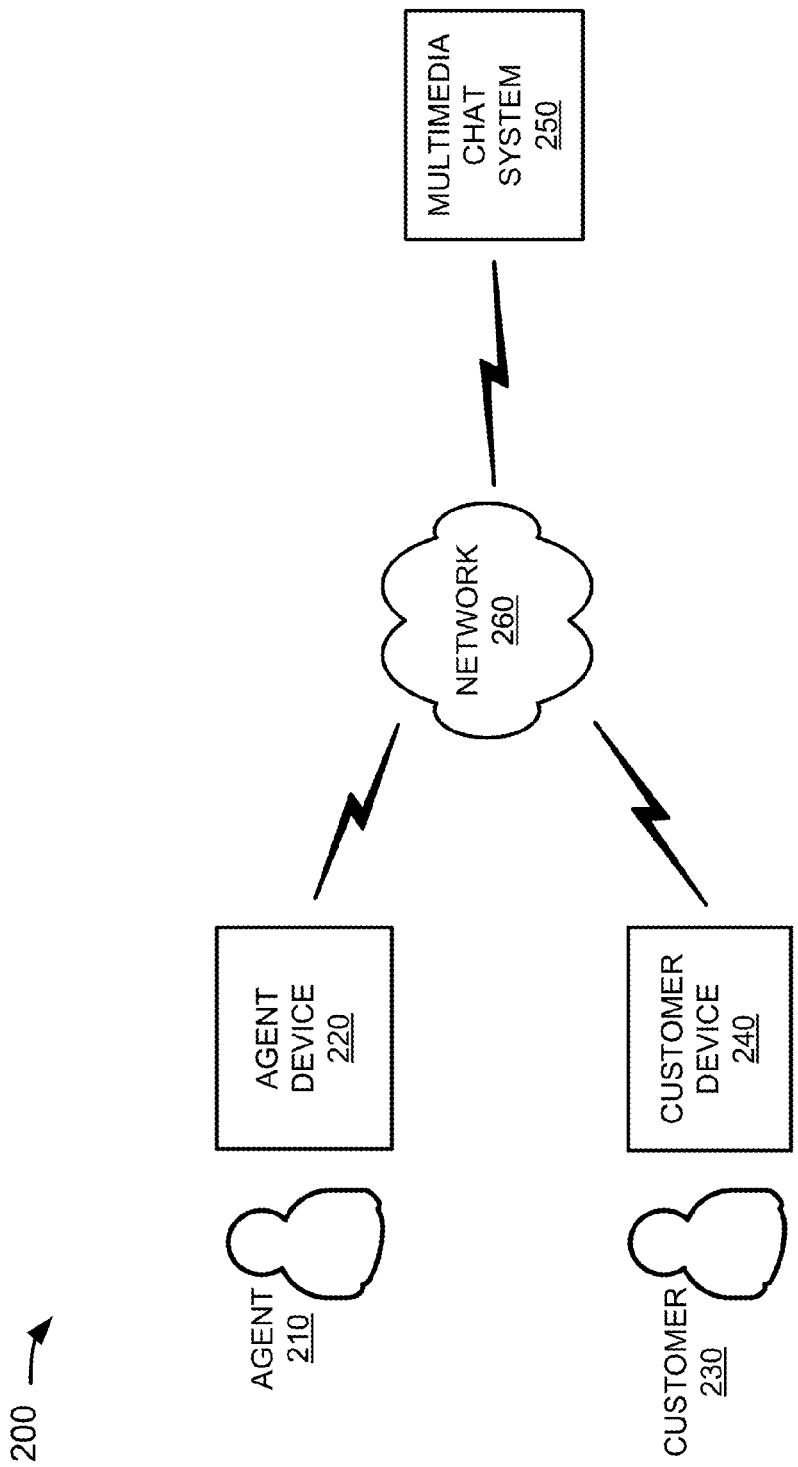
FIG. 2 is a diagram of an example environment in which systems and/or methods described herein may be implemented.

FIG. 2 is a diagram of an example environment 200 in which systems and/or methods described herein may be implemented. Environment 200 may include an agent 210, an agent device 220, a customer 230, a customer device 240, a multimedia chat system 250 (hereinafter referred to as "MCS 250"), and a network 260.

The number of agents, customers, devices and/or networks illustrated in FIG. 2 is provided for explanatory purposes. In practice, there may be additional agents, customers, devices, and/or networks; fewer agents, customers, devices, and/or networks; different agents, customers, devices, and/or networks; or differently arranged agents, customers, devices, and/or networks than are shown in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Agent 210 may include a customer service agent that communicates with customers (e.g., to assist in resolving customer service and/or product issues). Agent 210 may include a person and/or an automated computer agent. Agent 210 may use agent device 220 to communicate with customers. For example, agent 210 may use agent device 220 to communicate with a customer device 240 associated with a customer 230. When agent 210 is described as performing certain actions in implementations described herein, it is intended that those actions be performed with the assistance of a user device, such as agent device 220.

Agent device 220 and customer device 240 may include any computation and/or communication device that is capable of communicating with other devices and/or networks (e.g., network 260). For example, agent device 220 and customer device 240 may include a computer (e.g., a desktop computer, a laptop computer, a tablet computer, etc.), a radiotelephone, a personal communications system ("PCS") terminal (e.g., that may combine a cellular telephone with data processing and data communications capabilities), a personal digital assistant ("PDA") (e.g., that may include a radiotelephone, a pager, Internet/intranet access, etc.), a smart phone, a camera, a personal gaming system, and/or any other type of computation and/or communication device. Agent device 220 and customer device 240 may send traffic to and/or receive traffic from other devices via a network, such as network 290.

Customer 230 may include a customer that communicates with customer service agents (e.g., to report product and/or service problems). Customer 230 may include a person and/or an automated computer agent. Customer 230 may use customer device 240 to communicate with agents. For example, customer 230 may use customer device 240 to communicate with agent device 220 associated with agent 210. When customer 230 is described as performing certain actions in implementations described herein, it is intended that those actions be performed with the assistance of a user device, such as customer device 240.

MCS 250 may include one or more computation and/or communication devices that gather, process, search, store, and/or provide information in a manner described herein. MCS 250 may perform operations associated with facilitating a multimedia chat session between agent device 220 and customer device 240. In some implementations, MCS 250 may perform operations associated with facilitating a multimedia chat session among agent device 220, customer device 240, and one or more other devices. Additionally, or alternatively, MCS 250 may perform operations associated with storing, managing, recommending, providing, editing, annotating, and/or sharing multimedia items.

Network 260 may include one or more wired and/or wireless networks. For example, network 260 may include a Public Land Mobile Network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 260 may include a wide area network ("WAN"), a metropolitan area network ("MAN"), a local area network ("LAN"), a Personal Area Network ("PAN"), an Internet Protocol Multimedia Subsystem ("IMS") network, a telephone network (e.g., a Public Switched Telephone Network ("PSTN")), an ad hoc network, an intranet, a fiber optic-based network (e.g., "FiOS"), and/or a combination of these or any other type of network.

Figure 3:
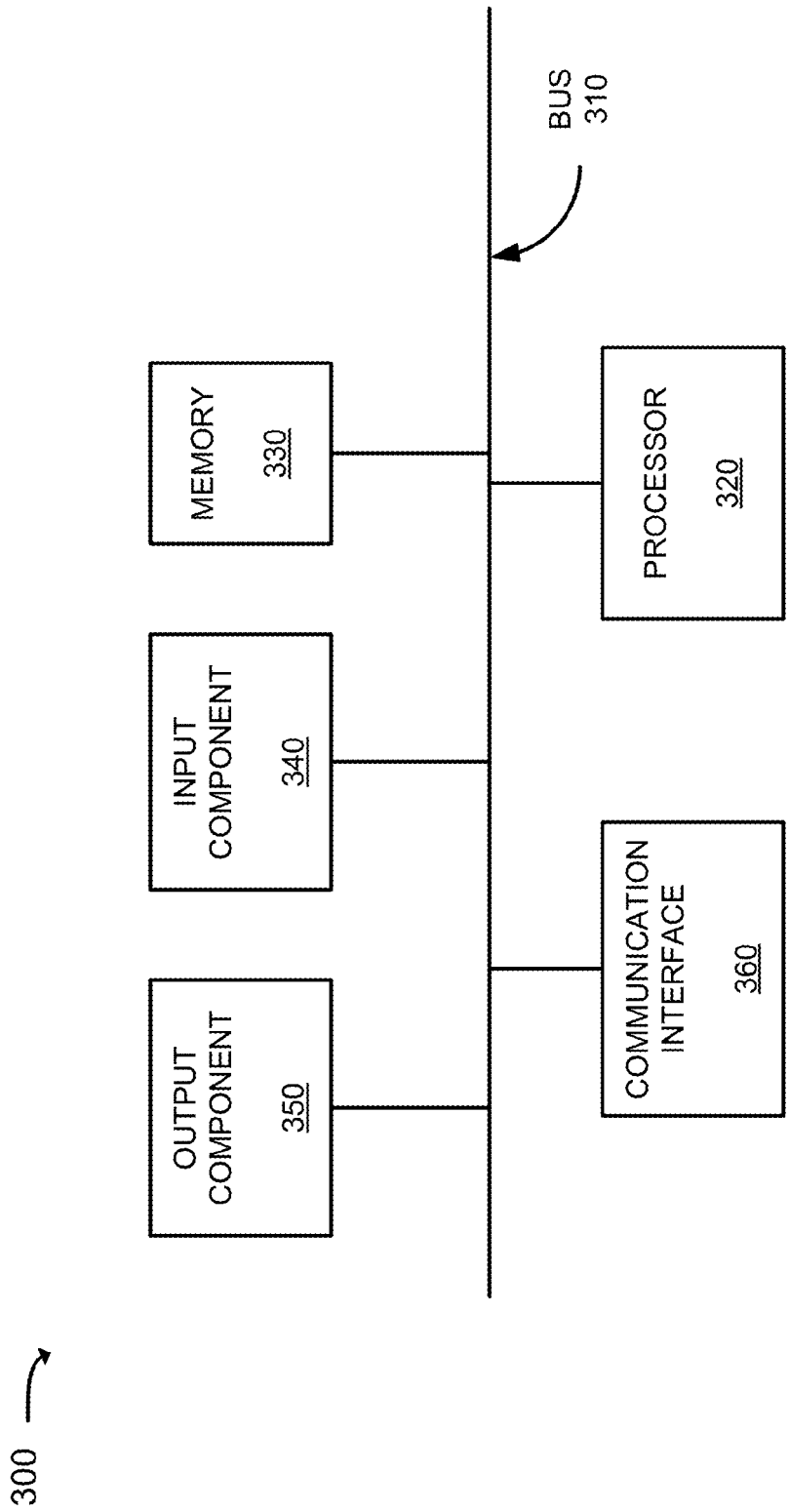
FIG. 3 is a diagram of example components of one or more devices or systems of FIG. 2.

FIG. 3 is a diagram of example components of a device 300. Device 300 may correspond to agent device 220, customer device 240, and/or MCS 250. Additionally, or alternatively, each of agent device 220, customer device 240, and/or MCS 250 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than those illustrated in FIG. 3.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that may interpret and execute instructions. Memory 330 may include a random access memory ("RAM"), a read only memory ("ROM"), and/or any type of dynamic or static storage device (e.g., a flash, magnetic, or optical memory) that may store information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes ("LEDs"), etc.). Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include mechanisms for communicating with another device and/or system via a network, such as network 260. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Figure 4:
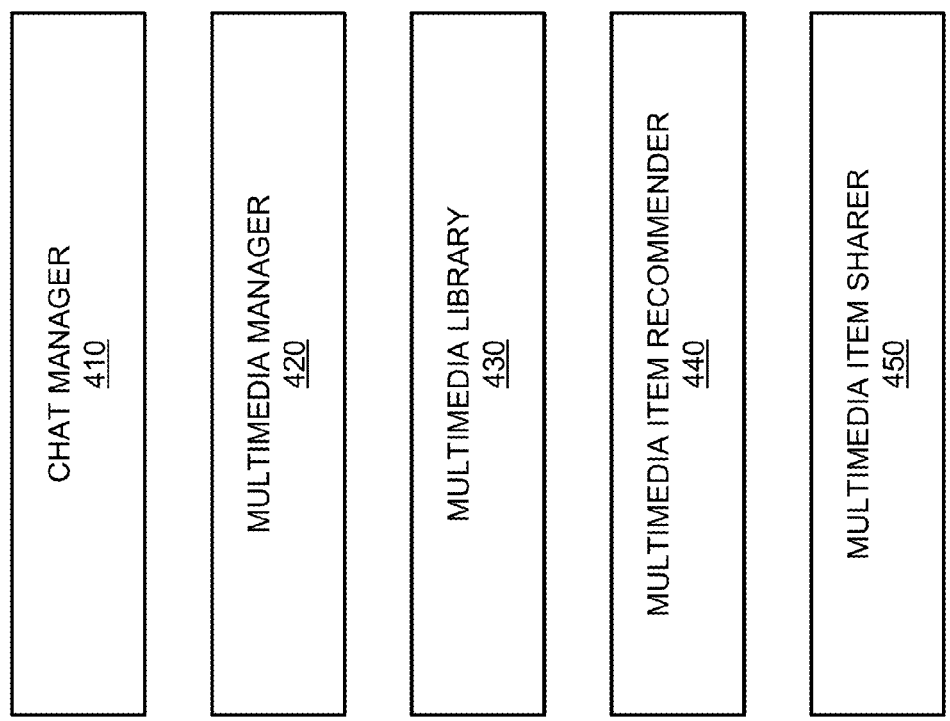
FIG. 4 is a diagram of example functional components of a multimedia chat system of FIG. 2.

FIG. 4 is a diagram of example functional components of a device 400 that may correspond to MCS 250. As illustrated, device 400 may include a chat manager 410, a multimedia manager 420, a multimedia library 430, a multimedia item recommender 440, and a multimedia item sharer 450. Each of functional components 410-450 may be implemented using one or more components of device 300. MCS 250 may individually include all of the functional components depicted in FIG. 4, or the functional components depicted in FIG. 4 may be distributed singularly or duplicatively in any manner between the devices illustrated in FIG. 2. In some implementations, MCS 250 may include other functional components (not shown) that aid in facilitating the sharing of multimedia items during chat sessions.

Chat manager 410 may perform operations associated with managing a chat session. In some implementations, chat manager 410 may initiate the chat session. For example, chat manager 410 may receive a request from a first user device (e.g., customer device 240) to initiate a chat session associated with a chat topic. Chat manager 410 may determine an agent 210 associated with the chat topic, and may initiate a chat session between the first user device and a second user device associated with agent 210 (e.g., agent device 220). Chat manager 410 may authenticate users (such as agent 210 and/or customer 230) and/or user devices (such as agent device 220 and/or customer device 240). Chat manager 410 may initiate the requested chat session when the users and/or the user devices are authenticated. Additionally, or alternatively, chat manager 410 may terminate chat sessions.

Multimedia manager 420 may perform operations associated with managing multimedia items. Multimedia items may include multimedia content, such as text, images, audio, video, audiovisual, animation, interactive content, or the like. Multimedia manager 420 may store the multimedia items in memory (e.g., memory of MCS 250), and may delete the multimedia items from the memory. In some implementations, multimedia manager 420 may control access to multimedia items. For example, multimedia manager 420 may control which users (e.g., agent 210 and/or customer 230) may access stored multimedia items, may share the multimedia items, may interact with the multimedia items, and/or may annotate the multimedia items. Additionally, or alternatively, multimedia manager 420 may permit editing of stored multimedia items.

Multimedia manager 420 may associate multimedia item attributes with multimedia items. Multimedia item attributes may include a description of a multimedia item, one or more keywords and/or tags associated with a multimedia item, an author and/or creator of a multimedia item, a creation date and/or time of a multimedia item, an access date and/or time of a multimedia item (e.g., the most recent date in which a user accessed, selected, and/or opened the multimedia item), a modification date and/or time of a multimedia item (e.g., a date the multimedia item was last edited), a quantity of accesses of a multimedia item during a particular time period (e.g., the number of times a multimedia item has been accessed since the multimedia item was created), one or more ratings associated with a multimedia item (e.g., an agent rating, a customer rating, etc.), a size of a multimedia item (e.g., file size, text length, image dimensions, audio length, video length, etc.), a file name associated with a multimedia item, and/or any other information that may be associated with multimedia items.

Multimedia library 430 may store information associated with multimedia items and multimedia item attributes. The information stored in multimedia library 430 may be managed by multimedia manager 420, as described above and elsewhere herein.

FIG. 5 is a diagram of an example data structure 500 that stores information associated with multimedia items and multimedia item attributes. Data structure 500 may be stored in a memory device (e.g., RAM, hard disk, etc.), associated with one or more devices and/or components shown in FIGS. 2-4. For example, data structure 500 may be stored by agent device 220, customer device 240, MCS 250, etc.

Data structure 500 may include a collection of fields, such as a multimedia item identifier field 510, a description field 520, a keywords field 530, an author field 540, a creation date field 550, a last access date field 560, a quantity of accesses field 570, an agent rating field 580, and a customer rating field 590. Data structure 500 includes fields 510-590 for explanatory purposes. In practice, data structure 500 may include additional fields, fewer fields, different fields, or differently arranged fields than are described with respect to data structure 500.

Multimedia item identifier field 510 may store information that identifies a multimedia item. For example, multimedia item identifier field 510 may store a name, a title, and/or a file name associated with a multimedia item.

Description field 520 may store information that describes the multimedia item identified by multimedia item identifier field 510. For example, description field 520 may store a textual description of a multimedia item.

Keywords field 530 may store information that describes the multimedia item identified by multimedia item identifier field 510. For example, keywords field 530 may store one or more keywords and/or tags that briefly describe or identify a multimedia item.

Author field 540 may store information that identifies an author and/or a creator of the multimedia item identified by multimedia item identifier field 510. For example, author field 540 may store the name of one or more authors of a multimedia item. As illustrated, a name may be stored in any format, including a first name, a last name, a full name, initials, etc.

Creation date field 550 may store information that identifies a creation date and/or time associated with the multimedia item identified by multimedia item identifier field 510. For example, creation date field 550 may store a date on which a multimedia item was created. As illustrated, a date may be stored in any format.

Last access date field 560 may store information that identifies the last date and/or time date that the multimedia item identified by multimedia item identifier field 510 was accessed. As illustrated, a date may be stored in any format.

Quantity of accesses field 570 may store information that identifies a quantity of accesses of the multimedia item identified by multimedia item identifier field 510. For example, quantity of accesses field 570 may indicate a number of times that a multimedia item was accessed (e.g., by an agent).

Agent rating field 580 may store information that identifies an agent rating of the multimedia item identified by multimedia item identifier field 510. As illustrated, any rating scale may be used, such as a fixed scale (e.g., 1 through 10, A through F, etc.), a binary scale (e.g., + or −, Good or Bad, etc.), or the like.

Customer rating field 590 may store information that identifies a customer rating of the multimedia item identified by multimedia item identifier field 510. As illustrated, any rating scale may be used, such as a fixed scale (e.g., 1 through 10, A through F, etc.), a binary scale (e.g., + or −, Good or Bad, etc.), or the like.

Information for a single multimedia item may be conceptually represented as a row in data structure 500. For example, the first row in data structure 500 may correspond to a multimedia item identified as "PhoneAA.img," with a description of "Image of Phone Model AA," keywords of "Phone" and "Model AA," an author of "Smith," a creation date of "May 14, 2012," a last accessed date of "May 14, 2012," a quantity of accesses of "2," an agent rating of "B," and a customer rating of "A."

Returning to FIG. 4, multimedia item recommender 440 may perform operations associated with recommending a multimedia item. Multimedia item recommender 440 may recommend multimedia items based on user specified attributes. In some implementations, multimedia item recommender 440 may receive desired attributes from a search query, such as a search query received from agent device 220 and/or customer device 240. The search query may identify attributes of a multimedia item, such as a keyword and/or tag, an author and/or creator, a creation date and/or time, an access date and/or time (e.g., the most recent access date), a modification date and/or time, a quantity of accesses, a quantity of accesses during a particular time period, one or more ratings (e.g., an agent rating, a customer rating, etc.), a size (e.g., file size, text length, image dimensions, audio length, video length, etc.), a file name, and/or any other attributes that may be associated with multimedia items.

In some implementations, multimedia item recommender 440 may receive desired attributes from information associated with a multimedia chat session, such as a chat topic and/or category, an agent and/or a customer associated with the chat session, a type of device being used to participate in the chat session, or the like. For example, multimedia item recommender 440 may receive a chat topic, and may use the chat topic as an attribute when recommending multimedia items (e.g., a chat topic may be associated with one or more keywords, such as "PHONE MODEL AA").

As another example, multimedia item recommender 440 may identify an agent participating in a chat session, and may use the identified agent to aid in recommending multimedia items (e.g., by recommending multimedia items authored by the agent and/or rated highly by the agent). As another example, multimedia item recommender 440 may identify a customer participating in a chat session, and may use the identified customer to aid in recommending multimedia items (e.g., by recommending multimedia items rated highly by the customer in previous chat sessions). As another example, multimedia item recommender 440 may identify a type of device (e.g., agent device 220, client device 240, etc.) being used to participate in the chat session, and may use the identified device type to aid in recommending multimedia items (e.g., by recommending multimedia items associated with the identified device type).

Multimedia item recommender 440 may use any type or combination of attributes in order to recommend multimedia items. In one example implementation, multimedia item recommender 440 may recommend multimedia items based on a comparison between a desired keyword and a keyword associated with a multimedia item. Additionally, or alternatively, multimedia item recommender 440 may recommend multimedia items associated with a particular author, created on a particular date, modified on a particular date, accessed on a particular date, accessed a certain quantity of times, accessed a certain quantity of times during a particular time period, having a particular size, having a particular file name, having a particular agent rating, having a particular customer rating, etc. Additionally, or alternatively, multimedia item recommender 440 may apply different weights to different attributes in order to recommend multimedia items. For example, a customer rating of a multimedia item may be weighted more heavily than a quantity of accesses for the multimedia item.

Multimedia item recommender 440 may use thresholds in order to recommend multimedia items. For example, multimedia item recommender 440 may recommend multimedia items created, modified, accessed, and/or last accessed before, on, and/or after a particular date and/or time, accessed more and/or less than a threshold number of times, accessed more and/or less than a threshold number of times during a particular time period, having a size greater and/or less than a threshold size, having an agent rating higher and/or lower than a threshold rating value, having a customer rating higher and/or lower than a threshold rating value, etc.

Multimedia item recommender 440 may search through a memory storing multimedia items in order to recommend multimedia items. For example, multimedia item recommender 440 may search through multimedia library 430 in order to recommend multimedia items.

In some implementations, multimedia item recommender 440 may rank multiple multimedia items according to a relevance score. The relevance score may be calculated based on how closely the desired attributes match attributes of a stored multimedia item. For example, the relevance score may be incremented for each attribute of a multimedia item that matches a desired attribute. For example, multimedia item recommender 440 may receive three attributes from a user (e.g., a keyword of "phone," an author of "Smith," and a customer rating greater than 3). Multimedia items that include all three of the attributes may be ranked highest, multimedia items that include two of the three attributes may be ranked next, and multimedia items that include one of the attributes may be ranked last. Multimedia items not including any of the attributes may not be included as a recommendation. Multimedia item recommender 440 may use any threshold to determine which multimedia items to recommend (e.g., multimedia item recommender 440 may only recommend multimedia items that have at least two of the desired attributes).

Multimedia item recommender 440 may transmit the recommended multimedia items for display on a user device (e.g., agent device 220 and/or customer device 240). In some implementations, the recommended multimedia items may be displayed in a ranked order according to the relevance score, with multimedia items having a highest relevance score displayed at the top of a list.

Multimedia item sharer 450 may perform operations associated with sharing a multimedia item. Multimedia item sharer 450 may transmit a multimedia item for display on one or more devices, such as devices engaged in a chat session (e.g., agent device 220 and customer device 240). In some implementations, multimedia item sharer 450 may transmit a preview of a recommended multimedia item for display on a user device (e.g., agent device 220). Multimedia item sharer 450 may receive preview feedback that indicates whether a recommended multimedia item being previewed should be transmitted for display on another user device (e.g., customer device 240).

Multimedia item sharer 450 may permit users to add annotations to a multimedia item. For example, multimedia item sharer 450 may receive an annotation to a multimedia item from a user device (e.g., agent device 220) and may transmit the annotation for display on another user device (e.g., customer device 240). An annotation may include any editing of a multimedia item, such as an addition to a multimedia item (e.g., adding text to a multimedia item, adding an image (such as an arrow) to a multimedia item, etc.), a deletion from a multimedia item (e.g., deleting part of an image, deleting text, etc.), an addition of a bookmark to a multimedia item (e.g., denoting a certain portion of an audio or video clip), etc.

Figure 6:
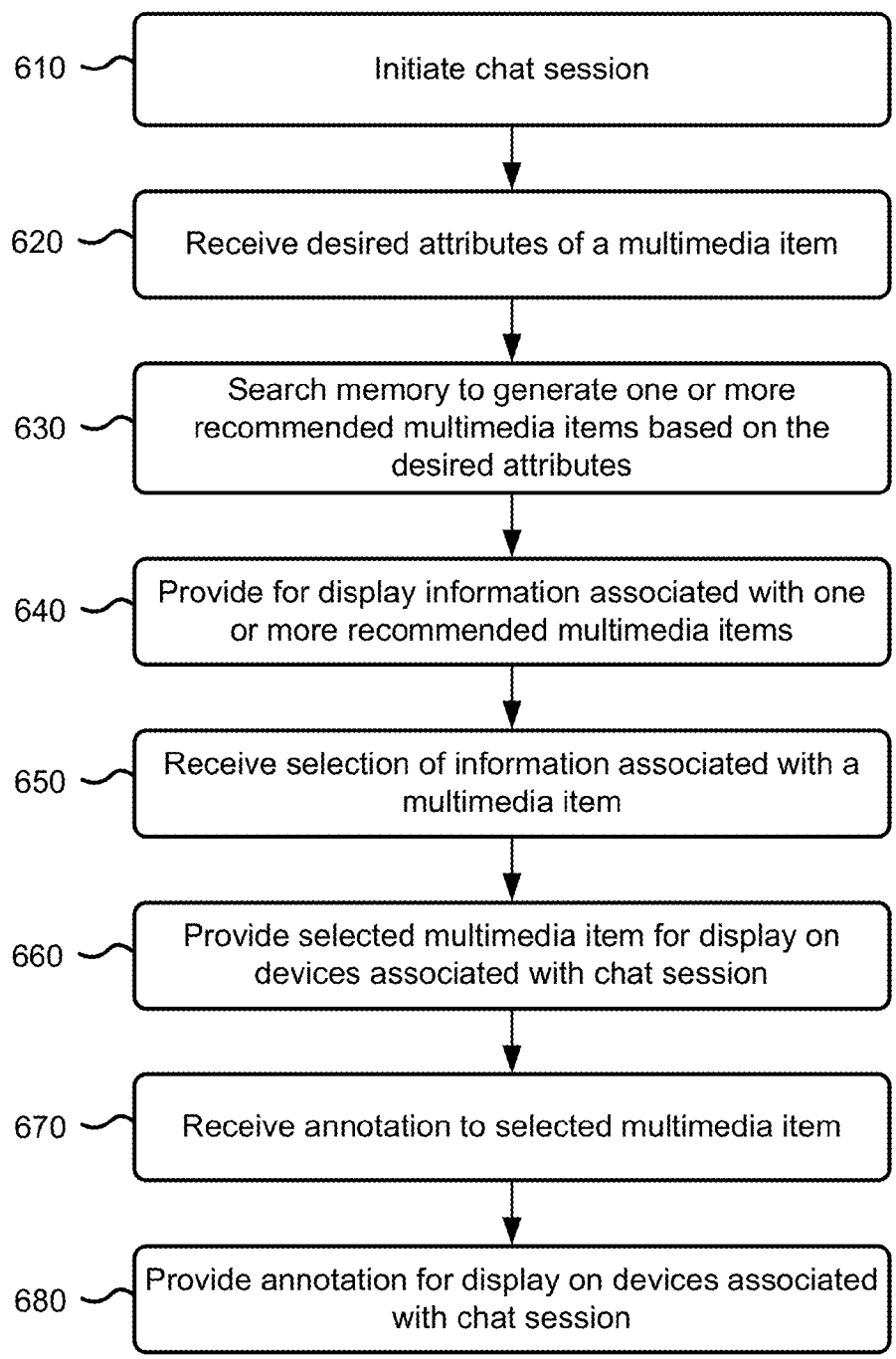
FIG. 6 is a diagram of an example process for displaying and annotating a multimedia item in a multimedia chat session.

FIG. 6 is a diagram of an example process 600 for displaying and annotating a multimedia item in a chat session. In some implementations, one or more of the process blocks of FIG. 6 may be performed by one or more components of agent device 220, customer device 240, and/or MCS 250.

Process 600 may include initiating a chat session (block 610). For example, chat manager 410 may initiate a chat session between agent device 220 and customer device 240.

Process 600 may include receiving desired attributes of a multimedia item (block 620). For example, multimedia item recommender 440 may receive a search query from agent device 220 that identifies desired attributes of a multimedia item (e.g., a keyword, author, etc.) to be compared to multimedia item attributes in order to generate a multimedia item recommendation.

Process 600 may include searching a memory to generate one or more recommended multimedia items based on the desired attributes (block 630). For example, multimedia item recommender 440 may compare desired attributes to attributes associated with a multimedia item stored by multimedia library 430 in order to generate recommended multimedia items.

Process 600 may include providing for display information associated with one or more recommended multimedia items (block 640). For example, multimedia item sharer 450 may provide names of recommended multimedia items for display on agent device 220.

Process 600 may include receiving a selection of information associated with a multimedia item of the one or more recommended multimedia items (block 650). For example, multimedia item sharer 450 may receive a selection of a name of a multimedia item from a list of names of recommended multimedia items.

Process 600 may include providing the selected multimedia item for display on devices associated with the chat session (block 660). For example, multimedia item sharer 450 may transmit a selected multimedia item for display on agent device 220 and/or customer device 240.

Process 600 may include receiving an annotation to the selected multimedia item (block 670). For example, multimedia item sharer 450 may receive an annotation (e.g., from agent device 220 and/or customer device 240) that adds text to a selected image.

Process 600 may include providing the annotation for display on devices associated with the chat session (block 680). For example, multimedia item sharer 450 may receive a textual annotation to an image from customer device 240, and may provide the textual annotation for display on agent device 220.

Figure 7:
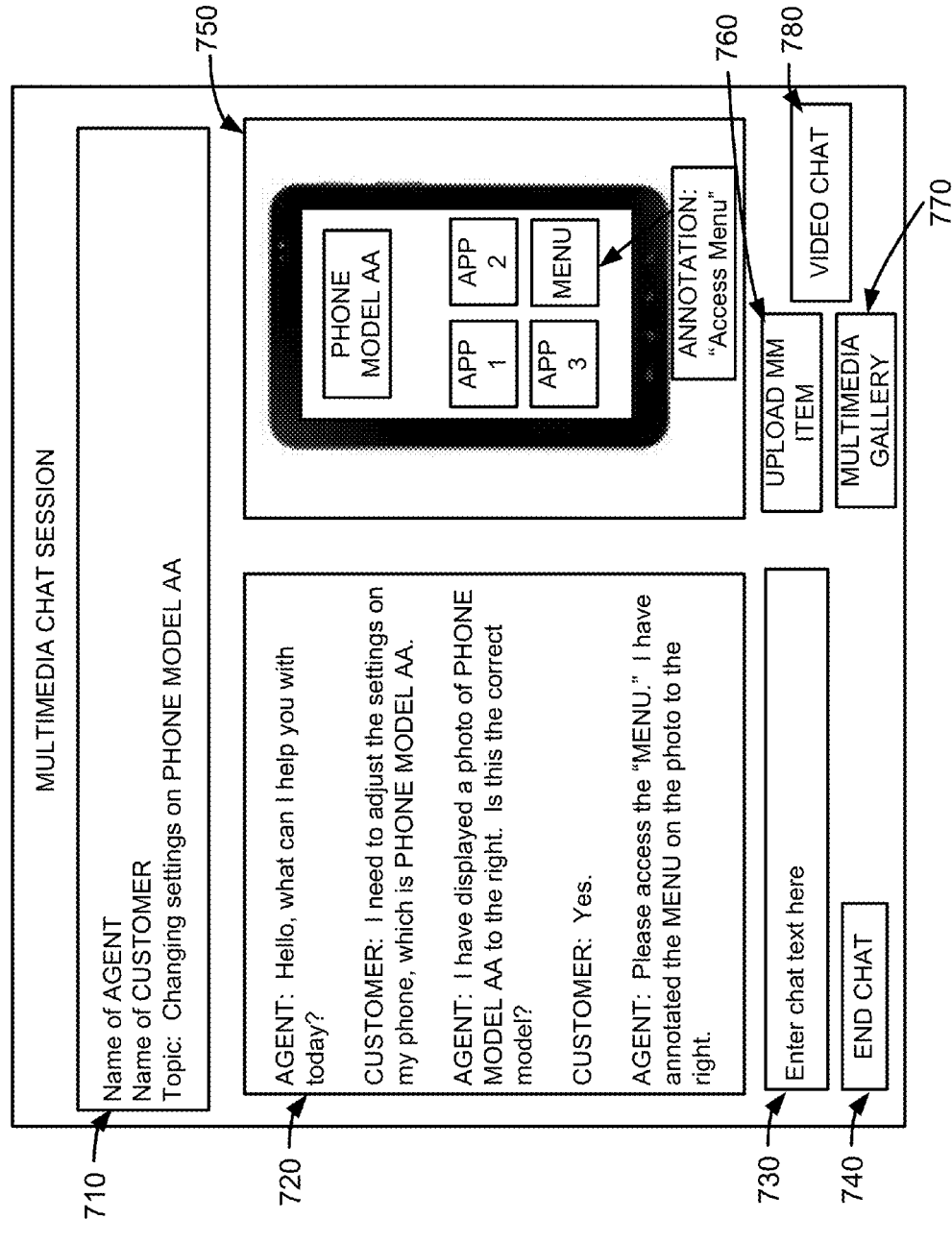
FIG. 7 is a diagram of an example user interface for displaying and annotating a multimedia item in a multimedia chat session.

FIG. 7 is a diagram of an example user interface 700 for displaying and annotating a multimedia item in a multimedia chat session. As illustrated, user interface 700 may include a heading element 710, a chat element 720, a chat input element 730, a chat termination element 740, a display element 750, a multimedia item upload element 760, a multimedia gallery element 770, and a video chat element 780. In the figures, "multimedia" may be abbreviated as "MM."

User interface 700 may be displayed by agent device 220 and/or customer device 240. User interface 700 may be customizable by agent device 220 and/or customer device 240. Additionally, or alternatively, user interface 700 may be preconfigured to a standard configuration, a specific configuration based on a type of device associated with agent device 220 and/or customer device 240, or a set of configurations based on capabilities and/or specifications associated with agent device 220 and/or customer device 240. Additionally, or alternatively, user interface 700 may include fewer elements, additional elements, different elements, or differently arranged elements than those illustrated in FIG. 7.

Heading element 710 may display information associated with a chat session. For example, heading element 710 may provide a name of an agent 210 associated with the chat session, a name of a customer 230 associated with the chat session, and a chat topic associated with the chat session (e.g., "Changing settings on PHONE MODEL AA").

Chat element 720 may display a textual chat dialog, such as a dialog between agent 210 and customer 230. For example, a history of text input during a chat session (such as via chat input element 730) may be displayed by chat element 720.

Chat input element 730 may provide a mechanism for a user (e.g., agent 210 and/or customer 230) to input text to be transmitted to other chat participants. For example, chat input element 730 may receive inputs, such as textual entries, from a user at a user device (e.g., agent device 220 and/or customer device 240), and may transmit the input for display in chat element 720 on one or more user devices (e.g., agent device 220 and/or customer device 240).

Chat termination element 740 may provide a mechanism (e.g., an icon, a button, a link, etc.) for a user (e.g., agent 210 and/or customer 230) to end a chat session. For example, agent 210 and/or customer 230 may terminate a chat session and/or close user interface 700 by selecting a portion of chat termination element 740.

Display element 750 may display a selected multimedia item. For example, agent 210 may select a multimedia item recommended by multimedia item recommender 440. The selected multimedia item may be displayed by display element 750 on agent device 220 and/or customer device 240. In one example implementation, agent 210 may select an image for display by display element 750, such as an image of a device (e.g., "PHONE MODEL AA," as illustrated).

Display element 750 may also provide a mechanism (e.g., an icon, a button, a link, etc.) for a user (e.g., agent 210 and/or customer 230) to annotate a displayed multimedia item. For example, display element 750 may permit users to add annotations to a displayed multimedia item, delete annotations from a displayed multimedia item, and/or edit annotations on a displayed multimedia item.

In some implementations, display element 750 may permit a user to annotate a displayed multimedia item by selecting a portion of the multimedia item that the user desires to annotate. For example, display element 750 may permit a user to click on a portion of an image and input a textual annotation (e.g., "Access Menu," as illustrated).

Multimedia item upload element 760 may provide a mechanism (e.g., an icon, a button, a link, etc.) for a user to upload a multimedia item from a device for display in the multimedia chat session. In some implementations, the uploaded multimedia item may be displayed by display element 750. Additionally, or alternatively, information associated with one or more uploaded multimedia items (e.g., a thumbnail, a file name, a preview, etc.) may be displayed by multimedia gallery element 770.

Multimedia gallery element 770 may display information (e.g., a thumbnail, an icon, etc.) associated with one or more multimedia items (e.g., available, recommended, and/or uploaded multimedia items). Multimedia gallery element 770 may permit a user to select information associated with a multimedia item. The selected multimedia item may be displayed in the multimedia chat session, such as by display element 750.

Video chat element 780 may provide a mechanism (e.g., an icon, a button, a link, etc.) that allows a user to enter into a video chat session with another user (e.g., between agent 210 and customer 230). Additionally, or alternatively, video chat element 780 may cause live streaming video of a user to be displayed in user interface 700.

Figure 8:
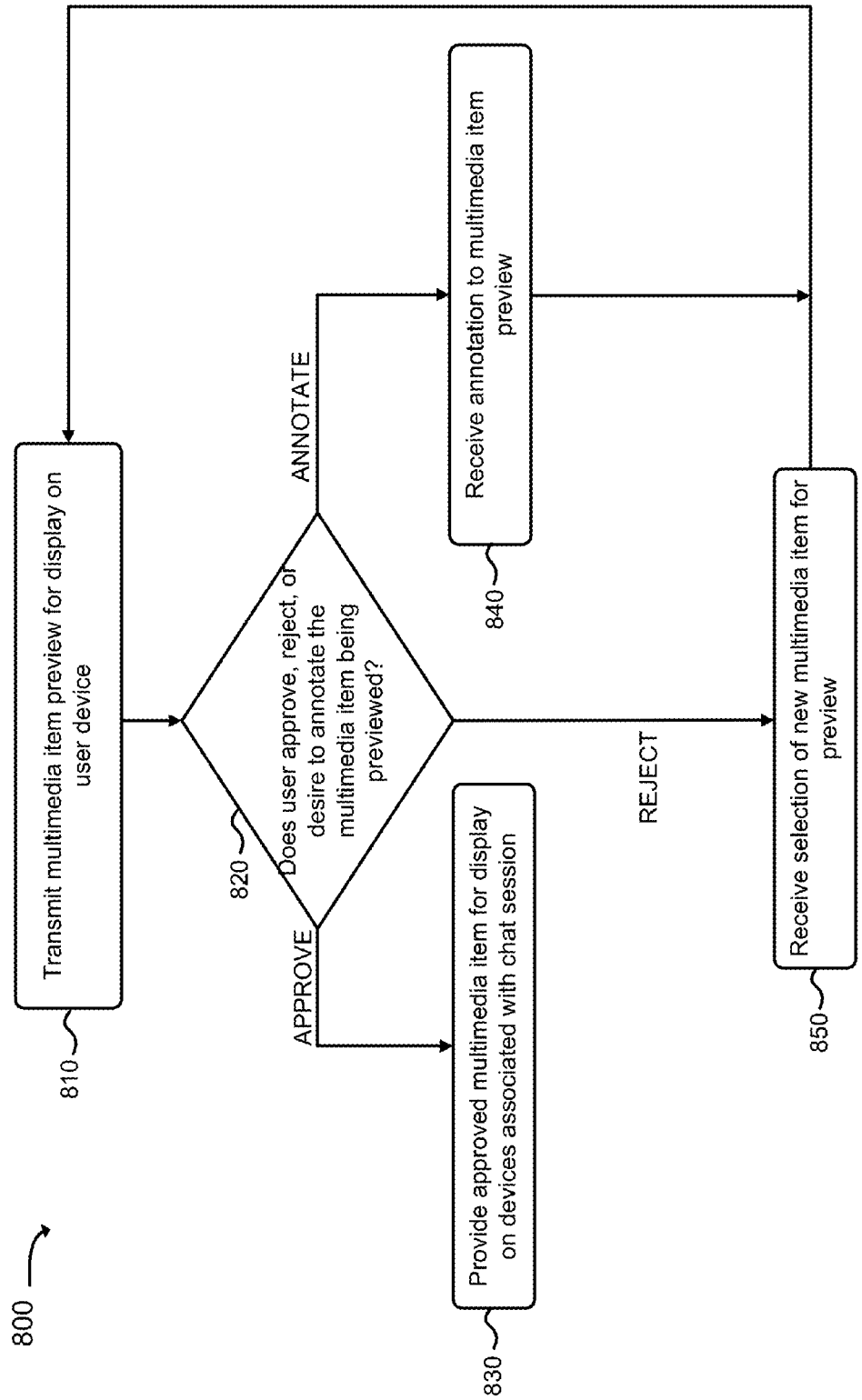
FIG. 8 is a diagram of an example process for previewing a multimedia item.

FIG. 8 is a diagram of an example process 800 for previewing a multimedia item. In some implementations, one or more of the process blocks of FIG. 8 may be performed by one or more components of agent device 220, customer device 240, and/or MCS 250.

Process 800 may include providing a multimedia item preview for display on a user device (block 810). For example, multimedia item sharer 450 may provide a multimedia item selected from one or more recommended multimedia items for display on agent device 220 and/or customer device 240.

Process 800 may include determining whether a user approves, rejects, or desires to annotate the multimedia item being previewed (block 820). In some implementations, multimedia item sharer 450 may receive input from a user (e.g., via agent device 220 and/or customer device 240) indicating whether a multimedia item preview is approved or rejected. Additionally, or alternatively, multimedia item sharer 450 may receive input from the user indicating that the user desires to annotate the multimedia item being previewed and/or select a new multimedia item to preview.

If the user has approved the multimedia item being previewed (block 820—APPROVE), process 800 may include providing the approved multimedia item for display on devices associated with the chat session (block 830). In some implementations, multimedia item sharer 450 may provide the approved multimedia item for display on agent device 220 and/or customer device 240, as described herein.

If the user desires to annotate the multimedia item being previewed (block 820—ANNOTATE), process 800 may include receiving an annotation to the multimedia item being previewed (block 840) and returning to block 810. In some implementations, multimedia item sharer 450 may receive the annotation to the multimedia item being previewed. The annotated multimedia item may be provided for display, and an input from the user indicating whether the annotated multimedia item is approved or rejected may be received. Process 800 may continue in an iterative manner until multimedia item sharer 450 determines that the user has approved a multimedia item.

If the user has rejected the multimedia item being previewed (block 820—REJECT), process 800 may include receiving a selection of a new multimedia item to be previewed (block 850) and returning to block 810. In some implementations, multimedia item sharer 450 may receive a selection of a new multimedia item for preview. The new multimedia item may be provided for display, and an input from the user indicating whether the new multimedia item is approved or rejected may be received. Process 800 may continue in an iterative manner until multimedia item sharer 450 determines that the user has approved a multimedia item.

Figure 9:
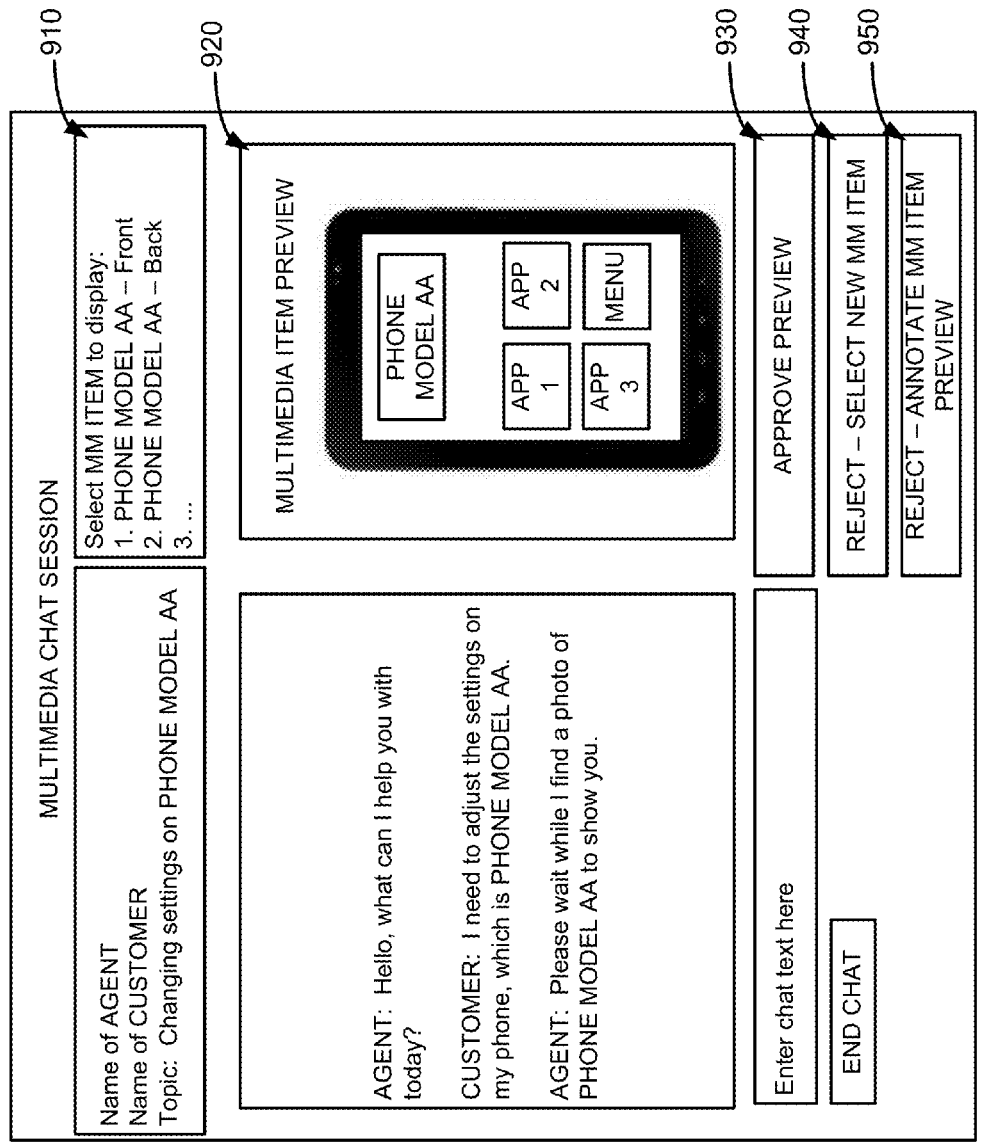
FIG. 9 is a diagram of an example user interface for previewing a multimedia item.

FIG. 9 is a diagram of an example user interface 900 for previewing a multimedia item. As illustrated, user interface 900 may include a multimedia item selection element 910, a multimedia item preview element 920, an approve preview element 930, a reject preview element 940, and an annotate preview element 950.

User interface 900 may be displayed by agent device 220 and/or customer device 240. User interface 900 may be customizable by agent device 220 and/or customer device 240. Additionally, or alternatively, user interface 900 may be pre-configured to a standard configuration, a specific configuration based on a type of device associated with agent device 220 and/or customer device 240, or a set of configurations based on capabilities and/or specifications associated with agent device 220 and/or customer device 240. Additionally, or alternatively, user interface 900 may include fewer elements, additional elements, different elements, or differently arranged elements than those illustrated in FIG. 9.

Multimedia item selection element 910 may display information associated with one or more recommended multimedia items. For example, multimedia item selection element 910 may display a ranked list of the names of the most relevant recommended multimedia items. Multimedia item selection element 910 may receive a selection of information associated with a multimedia item to be previewed, and may cause the selected multimedia item to be displayed in multimedia item preview element 920. For example, a user may select "PHONE MODEL AA—Front," as illustrated.

Multimedia item preview element 920 may display a multimedia item for preview, such as a multimedia item selected by a user utilizing multimedia item selection element 910. For example, multimedia item preview element 920 may display an image associated with phone model AA in response to a user selecting "PHONE MODEL AA—Front" from multimedia item selection element 910. In some implementations, multimedia item preview element 920 may correspond to display element 750.

Approve preview element 930 may provide a mechanism (e.g., an icon, a button, a link, etc.) for a user to select when the user wants the multimedia item preview to be transmitted for display on devices associated with the chat session (e.g., agent device 220 and/or customer device 240). For example, the phone image illustrated in multimedia item preview element 920 may be transmitted for display on customer device 240 when approve preview element 930 is selected by agent 210.

Reject preview element 940 may provide a mechanism (e.g., an icon, a button, a link, etc.) for a user to select when the user wants to preview a different multimedia item than the current multimedia item being displayed by multimedia item preview element 920. In some implementations, reject preview element 940 may permit a user to input new desired attributes and view relevant results (e.g., multimedia items associated with the desired attributes) in multimedia item selection element 910. Additionally, or alternatively, a user may select a different multimedia item from a list of recommended multimedia items displayed by multimedia item selection element 910. The selected multimedia item may be displayed by multimedia item preview element 920. For example, agent 210 may select a different image (e.g., "PHONE MODEL AA—Back") to be displayed by multimedia item preview element 920.

Annotate preview element 950 may provide a mechanism (e.g., an icon, a button, a link, etc.) for a user to select when the user wants to annotate the multimedia item preview that is being displayed by multimedia item preview element 920. In some implementations, annotate preview element 950 may permit a user to interact with the multimedia item preview displayed by multimedia item preview element 920 in order to annotate the multimedia item preview, as described herein.

Figure 10:
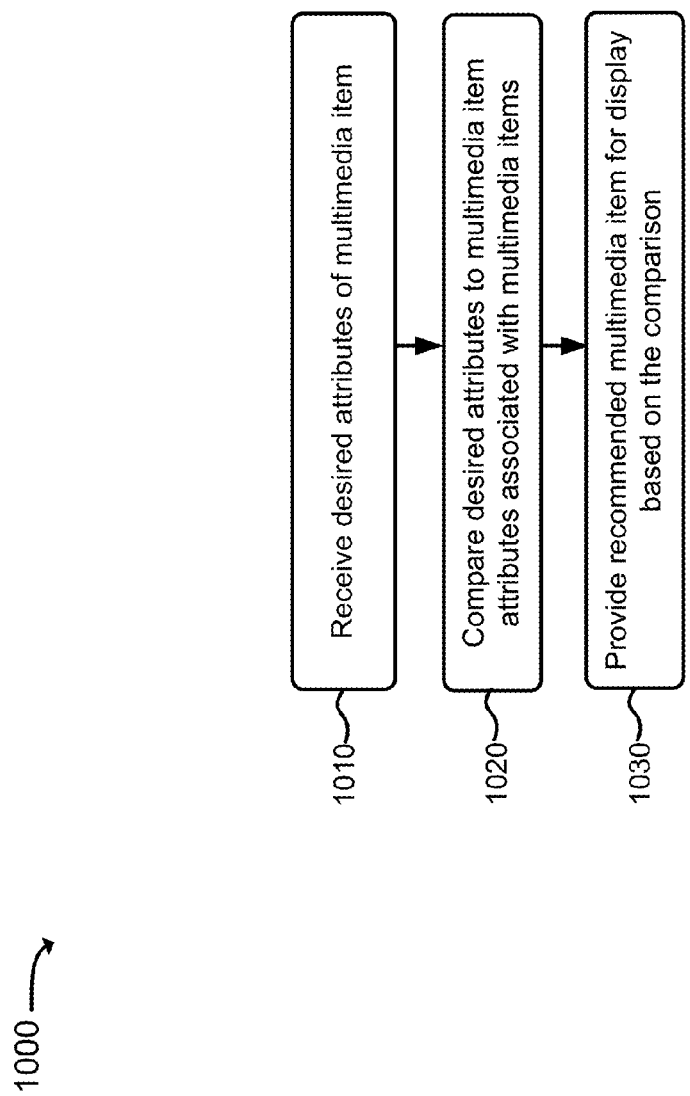
FIG. 10 is a diagram of an example process for recommending a multimedia item.

FIG. 10 is a diagram of an example process 1000 for recommending a multimedia item. In some implementations, one or more of the process blocks of FIG. 10 may be performed by one or more components of agent device 220, customer device 240, and/or MCS 250.

Process 1000 may include receiving desired attributes of a multimedia item (block 1010). In some implementations, multimedia item recommender 440 may receive desired attributes, as described herein.

Process 1000 may include comparing the desired attributes to attributes of stored multimedia items (block 1020). In some implementations, multimedia item recommender 440 may compare desired attributes to attributes of multimedia items stored in a memory, such as multimedia library 430, as described herein.

Process 1000 may include providing a recommended multimedia item for display based on the comparison (block 1030). In some implementations, multimedia item recommender 440 may provide a recommended multimedia item for display on a device (e.g., agent device 220 and/or customer device 240) based on the comparison, as described herein.

Figure 11:
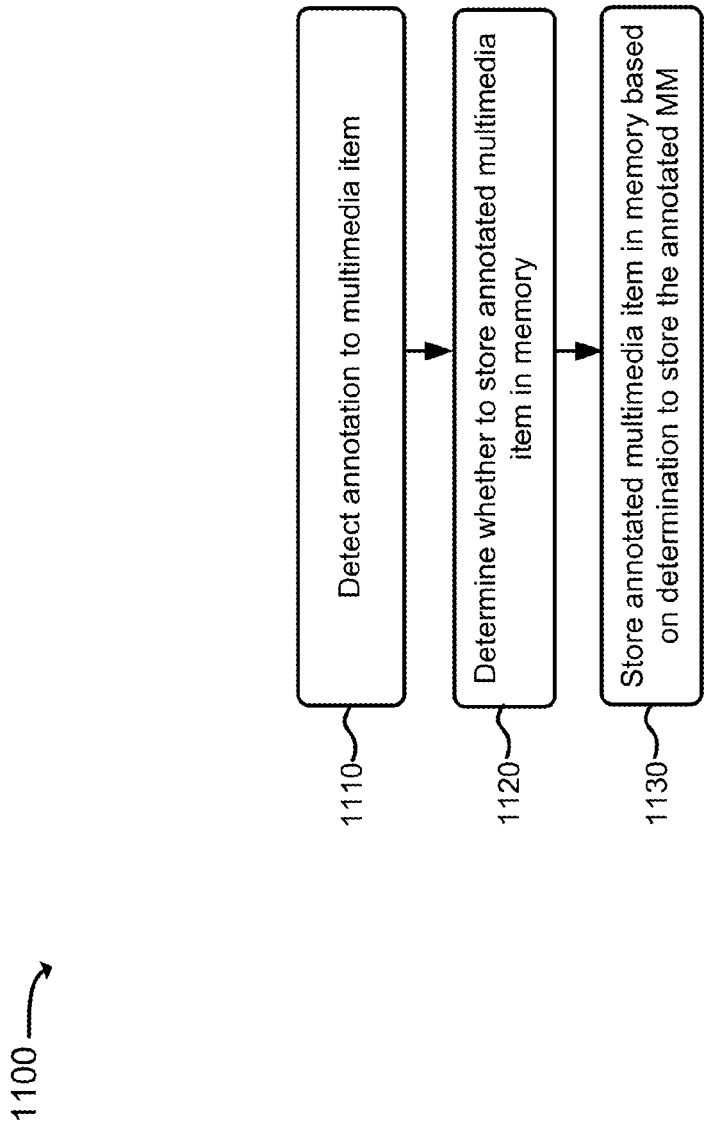
FIG. 11 is a diagram of an example process for storing annotated multimedia items in a memory.

FIG. 11 is a diagram of an example process 1100 for storing annotated multimedia items in a memory. In some implementations, one or more of the process blocks of FIG. 11 may be performed by one or more components of agent device 220, customer device 240, and/or MCS 250.

Process 1100 may include detecting an annotation to a multimedia item (block 1110). In some implementations, multimedia manager 420 may detect an annotation to a multimedia item. In some implementations, the detection may occur in response to a multimedia item being annotated. Additionally, or alternatively, the detection may occur after a chat session has terminated. For example, at the conclusion of the chat session, multimedia manager 420 may determine whether a multimedia item was annotated at some point during the multimedia chat session.

Process 1100 may include determining whether to store an annotated multimedia item in memory (block 1120). In some implementations, multimedia manager 420 may determine whether to store an annotated multimedia item in memory, such as multimedia library 430. The determination may be based on feedback received from agent device 220, such as feedback indicating that agent 210 desires that the annotated multimedia item be stored in memory. Additionally, or alternatively, the determination may be based on feedback received from customer device 240, such as feedback indicating that customer 230 found the annotated multimedia item to be helpful in solving a problem for the customer. Multimedia manager 420 may use a combination of agent and customer feedback, and may apply different weights to agent feedback and customer feedback, in order to determine whether to store the annotated multimedia item in memory.

Process 1100 may include storing the annotated multimedia item in memory based on a determination to store the annotated multimedia item (block 1130). In some implementations, multimedia manager 420 may store the annotated multimedia item in memory, such as multimedia library 430, based on the determination to store the annotated multimedia item. Multimedia manager 420 may also associate multimedia item attributes with the annotated multimedia item, as described herein.

Figure 12:
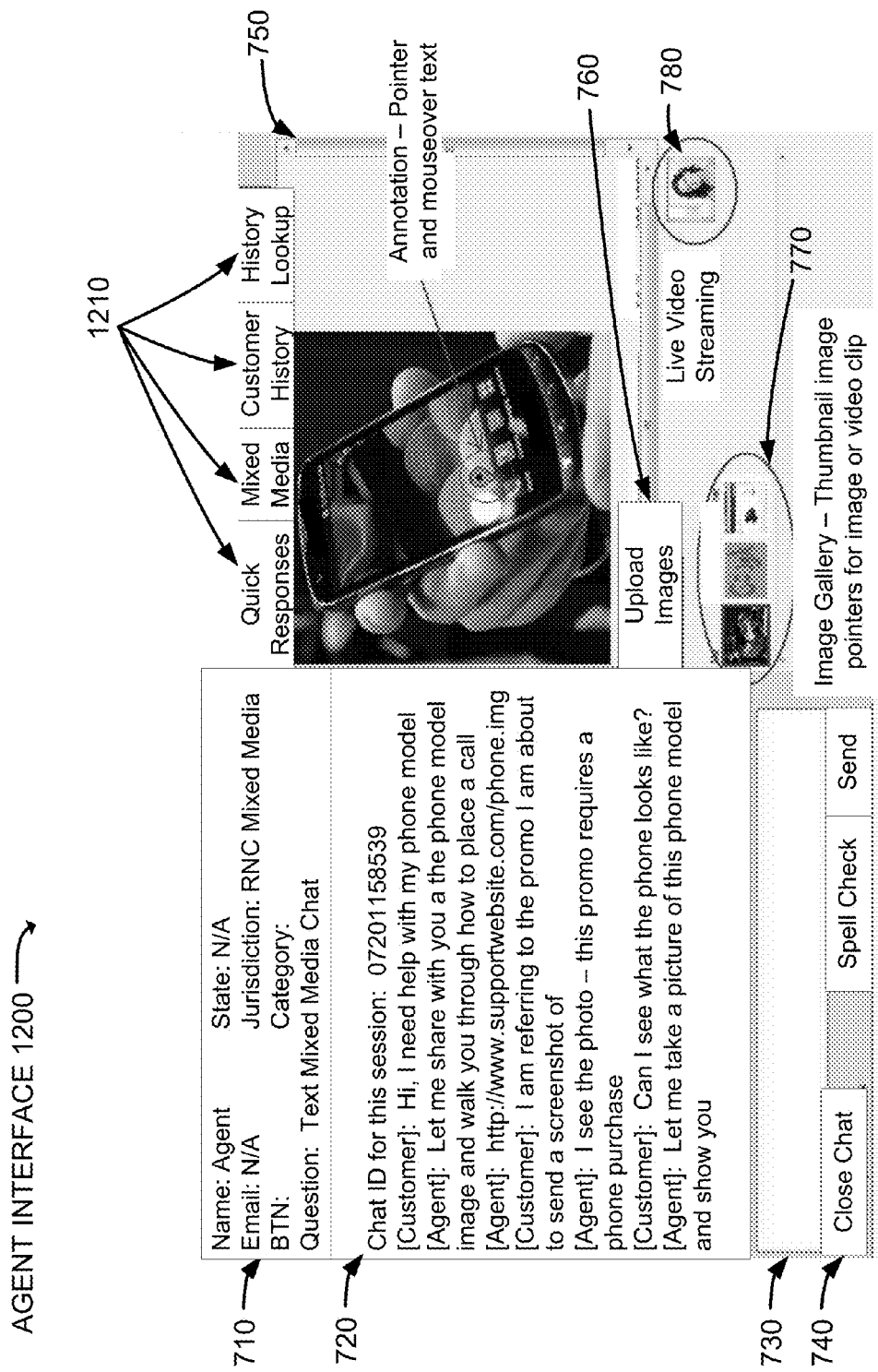
FIG. 12 is a diagram of an example agent interface for sharing multimedia items in a multimedia chat session.

FIG. 12 is a diagram of an example agent interface 1200 for sharing multimedia items in a multimedia chat session. As illustrated, agent interface 1200 may include heading element 710, chat element 720, chat input element 730, chat termination element 740, display element 750, multimedia item upload element 760, multimedia gallery element 770, and video chat element 780, as described herein in connection with FIG. 7. In some implementations, agent interface 1200 may also include one or more display switching elements 1210.

Agent interface 1200 may be displayed by agent device 220. Agent interface 1200 may be customizable by agent device 220. Additionally, or alternatively, agent interface 1200 may be pre-configured to a standard configuration, a specific configuration based on a type of device associated with agent device 220, or a set of configurations based on capabilities and/or specifications associated with agent device 220. Additionally, or alternatively, agent interface 1200 may include fewer elements, additional elements, different elements, or differently arranged elements than those illustrated in FIG. 12.

Display switching elements 1210 may provide mechanisms (e.g., an icon, a button, a link, etc.) for a user to switch between different displays. For example, selecting a display switching element 1210 may provide a display that allows a user to view information associated with recommended multimedia items, to preview multimedia items, and/or to approve and/or reject previewed multimedia items for sharing (e.g., via elements 910-950, described herein). Additionally, or alternatively, selecting a display switching element 1210 may provide a display that allows a user to view, share, annotate, and/or upload multimedia items (e.g., via elements 750-780, described herein). Additionally, or alternatively, selecting a display switching element 1210 may provide a display of information associated with a customer participating in a chat session, such as a history of the chat session, a history of previous chat sessions associated with the customer, and/or a series of actions performed by a customer prior to initiating the chat session (e.g., a web navigation history).

Figure 13:
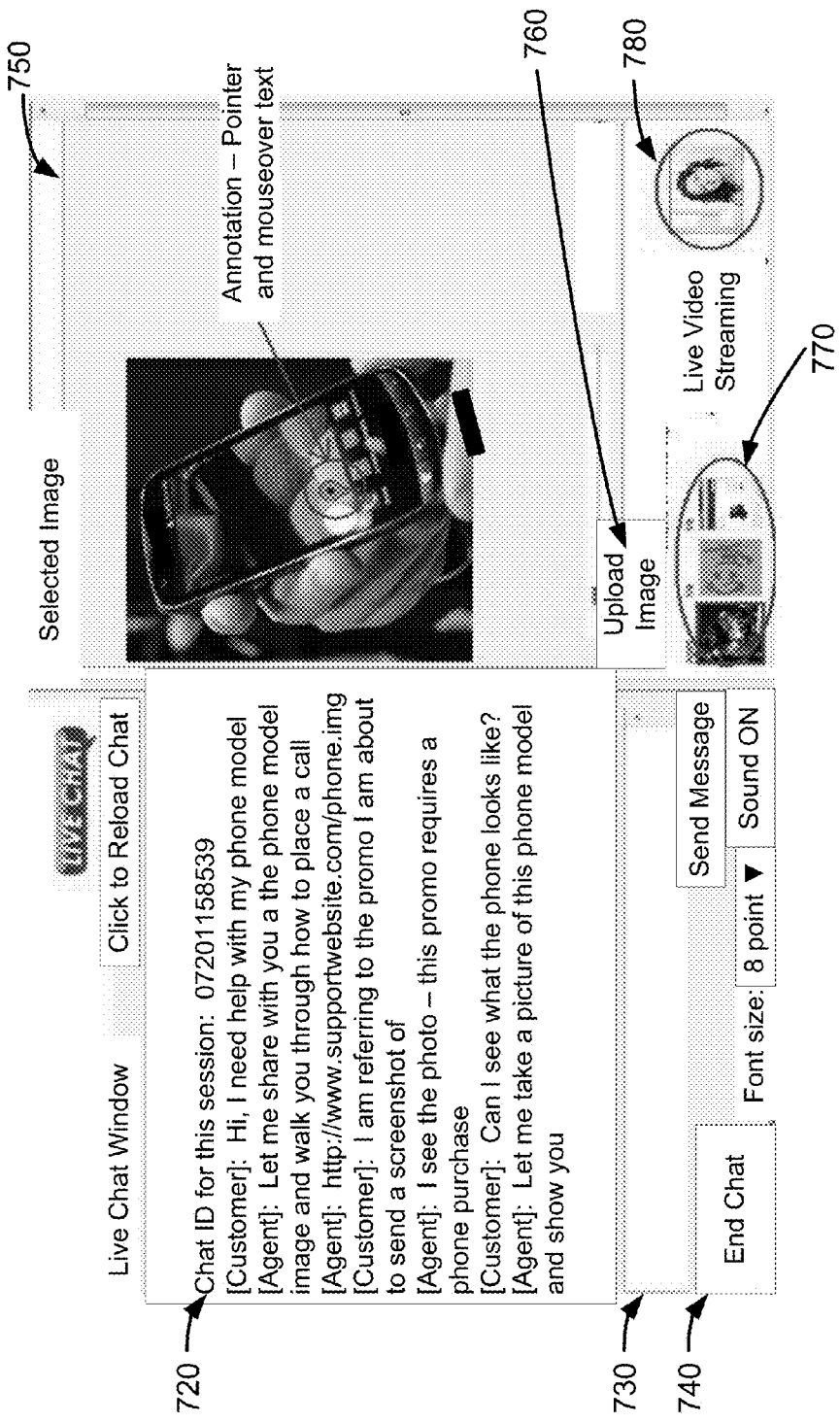
FIG. 13 is a diagram of an example customer interface for sharing multimedia items in a multimedia chat session.

FIG. 13 is a diagram of an example customer interface 1300 for sharing multimedia items in a multimedia chat session. As illustrated, customer interface 1300 may include chat element 720, chat input element 730, chat termination element 740, display element 750, multimedia item upload element 760, multimedia gallery element 770, and video chat element 780, as described herein in connection with FIG. 7.

Customer interface 1300 may be displayed by customer device 240. Customer interface 1300 may be customizable by customer device 240. Additionally, or alternatively, customer interface 1300 may be pre-configured to a standard configuration, a specific configuration based on a type of device associated with customer device 240, or a set of configurations based on capabilities and/or specifications associated with customer device 240. Additionally, or alternatively, customer interface 1300 may include fewer elements, additional elements, different elements, or differently arranged elements than those illustrated in FIG. 13.

Figure 14:
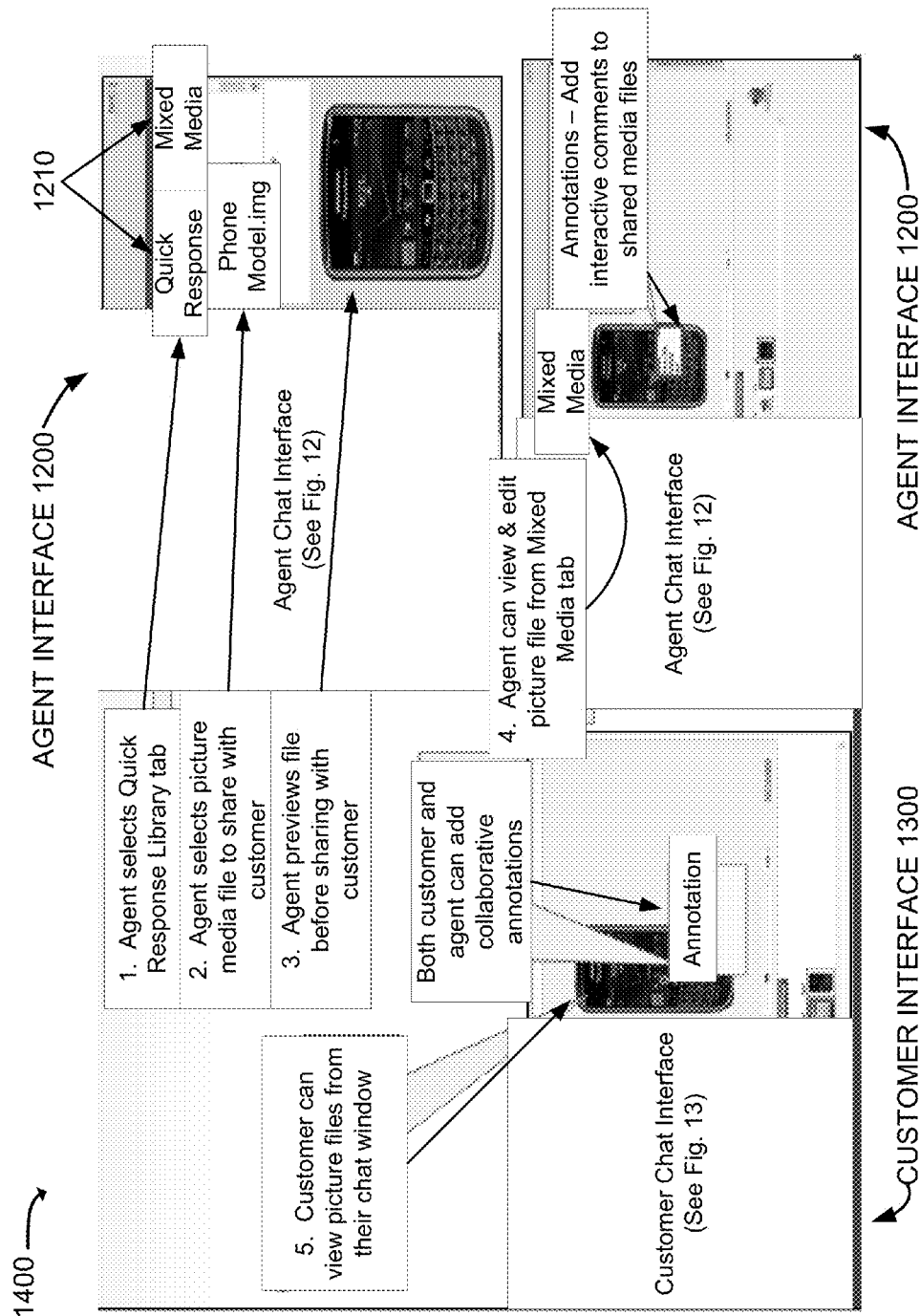
FIG. 14 is a diagram of example user interfaces that may be used to share images in a multimedia chat session.

FIG. 14 is a diagram of example user interfaces 1400 that may be used to share images in a multimedia chat session. As illustrated, agent 210 may user agent interface 1200 to select a multimedia item, such as an image, to share with customer 230. For example, agent 210 may use a display switching element 1210 (depicted as "Quick Response Library" tab or "Quick Responses") to display a list of recommended images and/or other multimedia items. Agent 210 may select an image in order to preview the image before sharing it with customer 230. Once the image has been shared with customer 230 via customer interface 1300, agent 210 and/or customer 230 may view the image, interact with the image, and/or add annotations (e.g., text, images, etc.) to the image. For example, agent 210 may view, interact with, and/or add annotations to the image by using a display switching element 1210 (depicted as "Mixed Media" tab).

Figure 15:
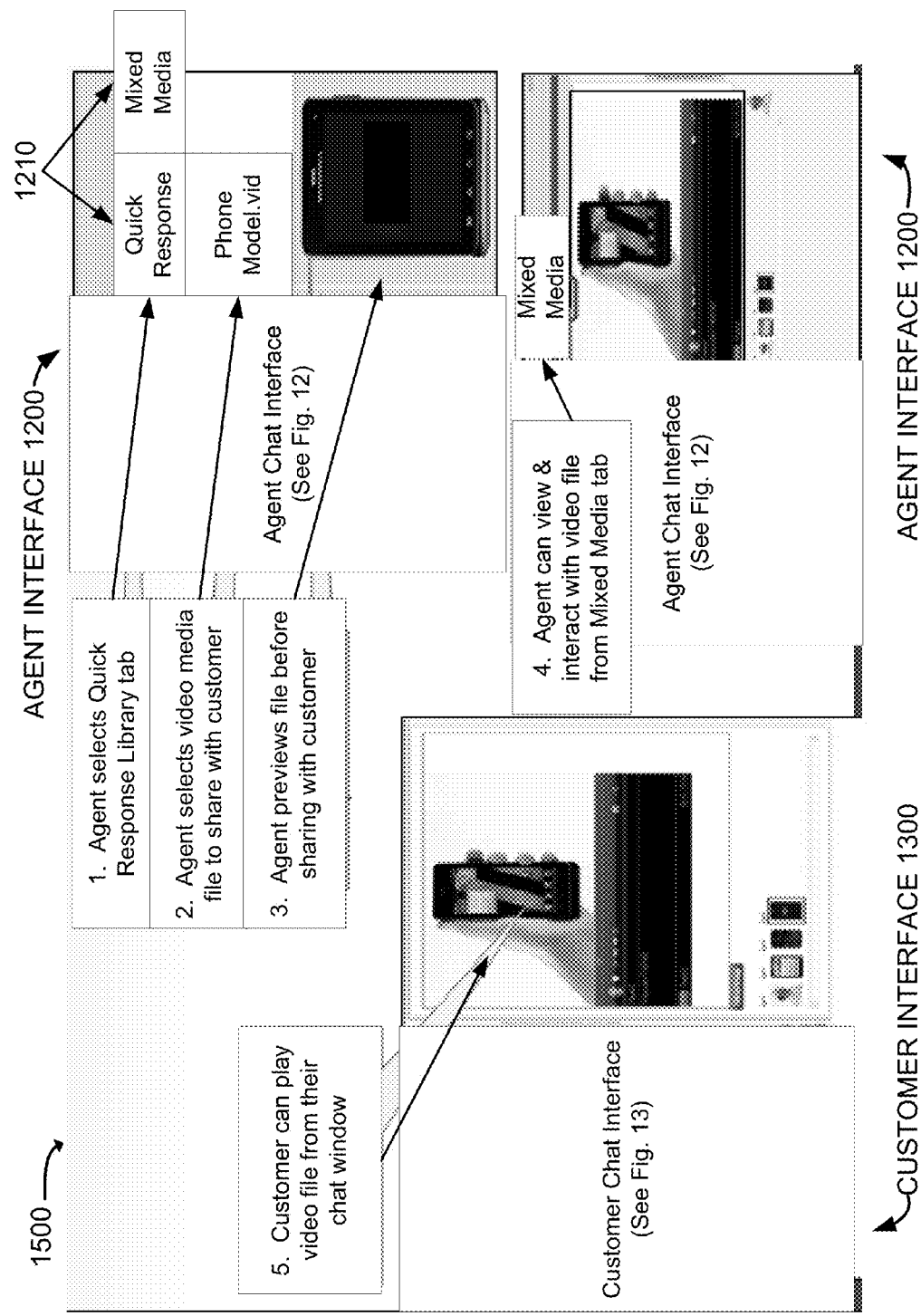
FIG. 15 is a diagram of example user interfaces that may be used to share video in a multimedia chat session.

FIG. 15 is a diagram of example user interfaces 1500 that may be used to share video in a multimedia chat session. As illustrated, agent 210 may user agent interface 1200 to select a multimedia item, such as a video, to share with customer 230. For example, agent 210 may use a display switching element 1210 (depicted as "Quick Response Library" tab or "Quick Responses") to display a list of recommended videos and/or other multimedia items. Agent 210 may select a video in order to preview the video before sharing it with customer 230. Once the video has been shared with customer 230 via customer interface 1300, agent 210 and/or customer 230 may play the video, interact with the video, and/or add annotations (e.g., bookmarks, audio, etc.) to the video. For example, agent 210 may view, play, interact with, and/or add annotations to the video by using a display switching element 1210 (depicted as "Mixed Media" tab).

Figure 16:
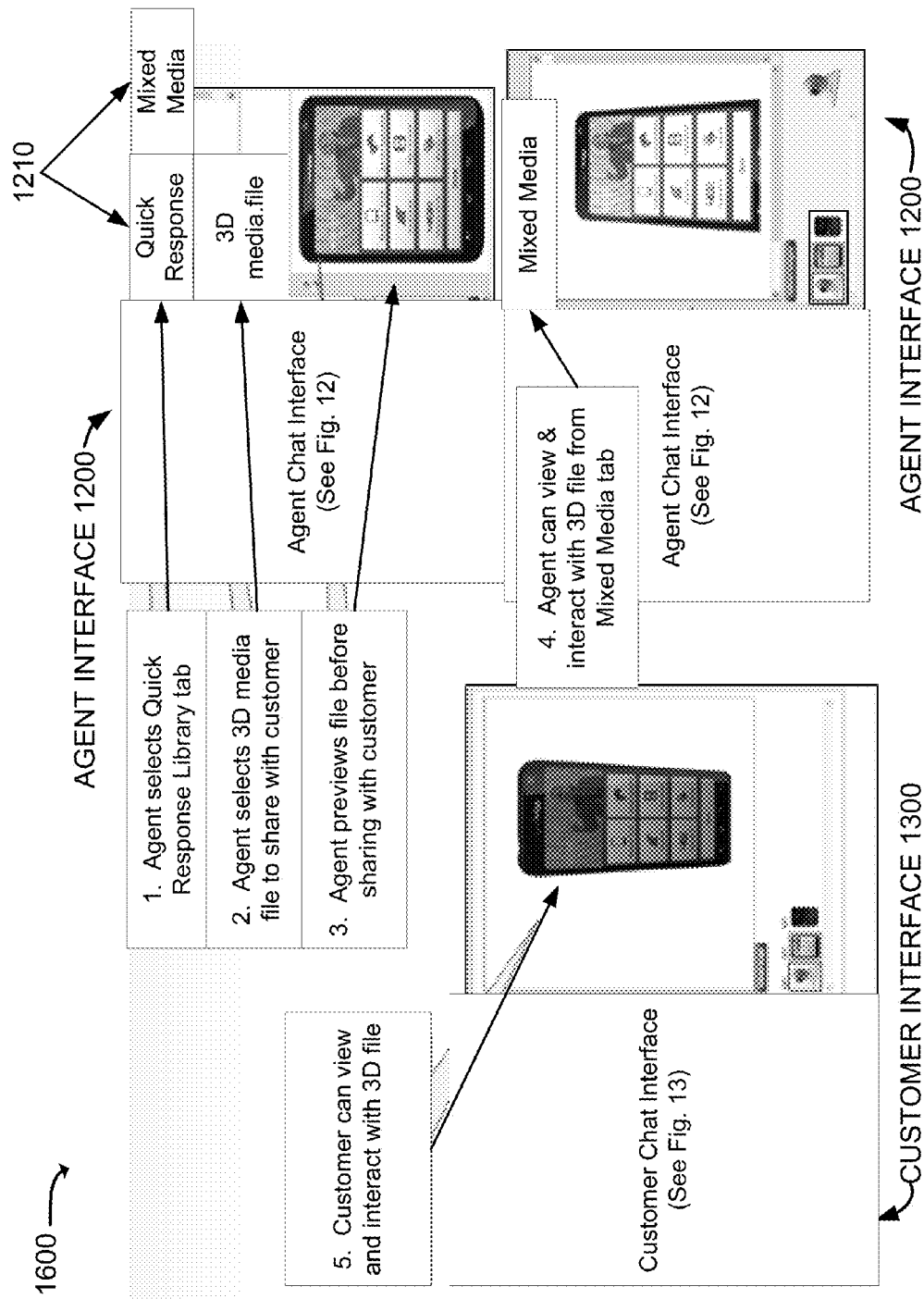
FIG. 16 is a diagram of example user interfaces that may be used to share interactive content in a multimedia chat session.

FIG. 16 is a diagram of example user interfaces 1600 that may be used to share interactive content in a multimedia chat session. As illustrated, agent 210 may user agent interface 1200 to select a multimedia item, such as interactive content (e.g., three dimensional media), to share with customer 230. For example, agent 210 may use a display switching element 1210 (depicted as "Quick Response Library" tab or "Quick Responses") to display a list of recommended interactive content and/or other multimedia items. Agent 210 may select interactive content to preview the interactive content before sharing it with customer 230. Once the interactive content has been shared with customer 230 via customer interface 1300, agent 210 and/or customer 230 may view the interactive content, interact with the interactive content, and/or add annotations (e.g., text, images, audio, video, etc.) to the interactive content. For example, agent 210 may view, interact with, and/or add annotations to the interactive content by using a display switching element 1210 (depicted as "Mixed Media" tab).

Figure 17:
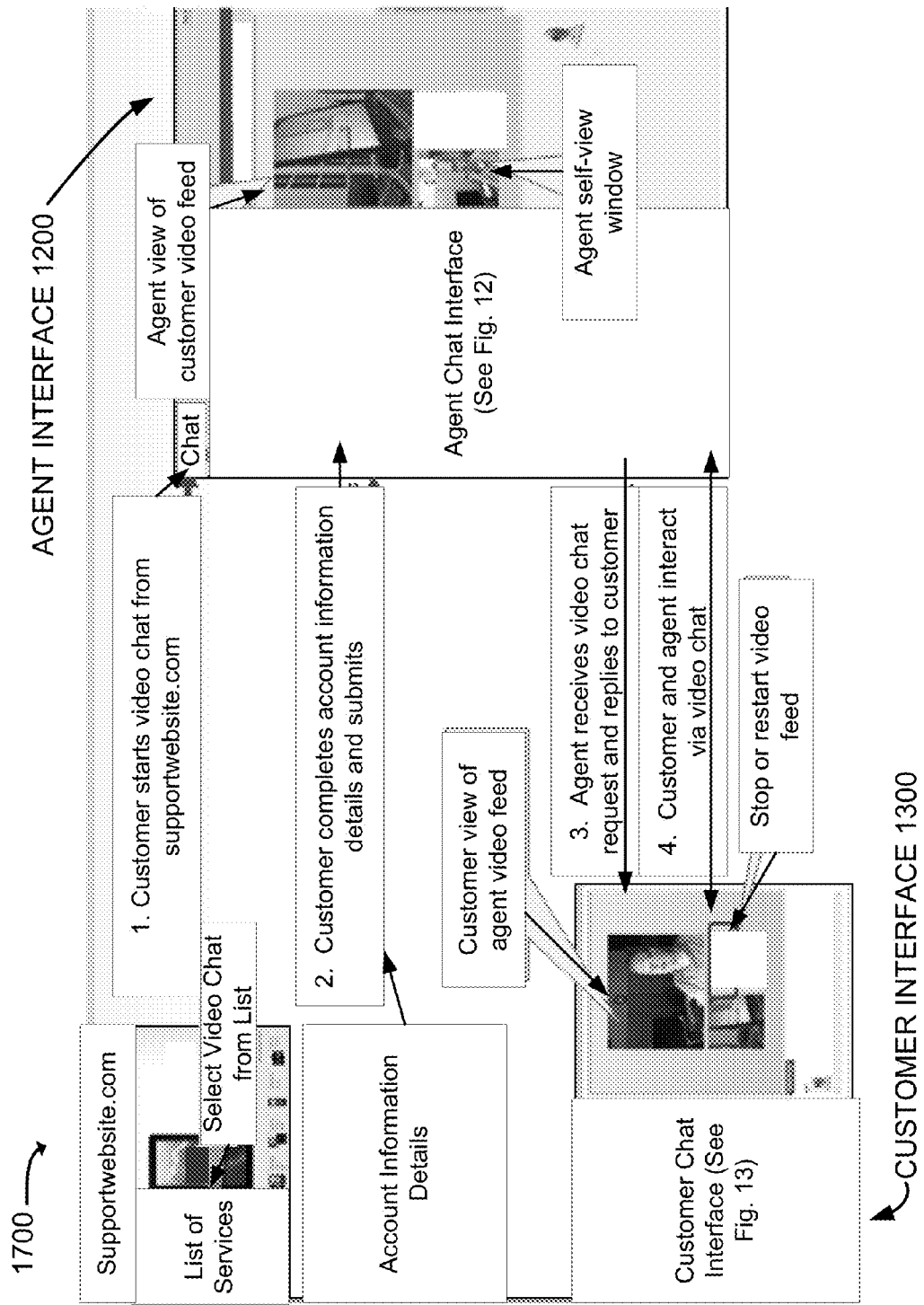
FIG. 17 is a diagram of example user interfaces that may be used to initiate and conduct a video chat session.

FIG. 17 is a diagram of example user interfaces 1700 that may be used to initiate and conduct a video chat session. As illustrated, customer 230, via customer interface 1300, may request a video chat session, such as from a web browser and/or application. Customer 230 may input customer information, such as a customer name, a chat topic, etc. Agent 210 may receive the customer request, and may initiate a video chat session via agent interface 1200. Once the video chat session has been initiated, agent 210 and customer 230 may interact via video chat (e.g., using agent interface 1200 and customer interface 1300).

Implementations described herein may prevent frustration resulting from poor communications between customers and agents. This may be achieved by allowing agents and customers to share and/or annotate multimedia items in a chat session in order to more effectively communicate problems and/or solutions.

The foregoing disclosure provides illustration and description, but is not intended to be exhaustive or to limit the embodiments to the precise form disclosed. Modifications and variations are possible in light of the above disclosure or may be acquired from practice of the embodiments.

While series of blocks have been described with regard to FIGS. 6, 8, 10, and 11, the order of the blocks may be modified in some implementations. Further, non-dependent blocks may be performed in parallel.

Certain data structures have been presented with regard to FIG. 5. These data structures are purely examples and merely serve to facilitate the description of the storage of information.

While the data structures presented with regard to FIG. 5 are represented as tables with rows and columns, in practice, the data structures may include any type of data structure, such as a linked list, a tree, a hash table, a database, or any other type of data structure. The data structures may include information generated by a device and/or component. Additionally, or alternatively, the data structures may include information provided from any other source, such as information provided by one or more users, and/or information automatically provided by one or more other devices.

As used herein, the term "component" is intended to be broadly construed as hardware, firmware, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
one or more processors to:
initiate a chat session between an agent device and a customer device;
receive, from the agent device, information identifying a plurality of attributes associated with a plurality of multimedia items;
compare the plurality of attributes to a plurality of multimedia item attributes associated with the plurality of multimedia items;
rank the plurality of multimedia items based on a quantity of the plurality of attributes that match the plurality of multimedia item attributes;
provide, from memory and for display via the agent device, information identifying the plurality of multimedia items based on the ranking,
each of the plurality of multimedia items including an attribute of the plurality of attributes;
receive, from the agent device, a selection of information identifying a particular multimedia item of the plurality of multimedia items;
provide, for display via the agent device, a preview of the particular multimedia item;
receive, from the agent device, an annotation to the particular multimedia item based on providing the preview of the particular multimedia item for display via the agent device,
the annotation creating an annotated multimedia item;
provide, for display via the agent device, a preview of the annotated multimedia item;
receive, from the agent device, an input indicating one of:
an approval of the annotated multimedia item,
a rejection of the annotated multimedia item, or
a rejection of the annotation;
selectively provide, for display and based on the input, one of:
the annotated multimedia item,
the annotated multimedia item being provided to the customer device and via the chat session when the input indicates the approval of the annotated multimedia item,
the information identifying the plurality of multimedia items, the information identifying the plurality of multimedia items being provided to the agent device for another selection when the input indicates the rejection of the annotated multimedia item, or the multimedia item, the multimedia item being provided to the agent device when the input indicates the rejection of the annotation;

receive a rating associated with the annotated multimedia item;

determine that the rating associated with the annotated multimedia item exceeds a threshold; and store the annotated multimedia item in a memory, associated with the device, based on the rating associated with the annotated multimedia item exceeding the threshold.

2. The device of claim 1, where, when receiving the information identifying the plurality of attributes, the one or more processors are to: receive information identifying at least one of:

a description of a multimedia item,
a keyword associated with the multimedia item,
an author of the multimedia item,
a creation date associated with the multimedia item,
an access date associated with the multimedia item
a modification date associated with the multimedia,
a quantity of accesses associated with the multimedia item during a particular time period,
a rating associated with the multimedia item,
a size of the multimedia item, or
a file name associated with the multimedia item.

3. The device of claim 1, where the one or more processors, when ranking the plurality of multimedia items, are further to:

rank the plurality of multimedia items based on a rating attribute,
the rating attribute being based on one or more ratings associated with one of the plurality of multimedia items.

4. The device of claim 1, where, when receiving the information identifying the plurality of attributes, the one or more processors are to: receive information identifying at least one of:

a topic of the chat session,
an agent associated with the chat session,
a customer associated with the chat session, or
a type of device being used to participate in the chat session.

5. A method, comprising:

initiating, by a processor, a chat session between a first user device and a second user device;

receiving, by the processor and from the first user device, information identifying a plurality of attributes associated with a plurality of multimedia items;

comparing, by the processor, the plurality of attributes to a plurality of multimedia item attributes associated with the plurality of multimedia items;

ranking, by the processor, the plurality of multimedia items based on a quantity of the plurality of attributes that match the plurality of multimedia item attributes;

providing, by the processor, from memory, and for display via the first user device, information identifying the plurality of multimedia items based on the ranking, each of the plurality of multimedia items including an attribute of the plurality of attributes;

receiving, by the processor and from the first user device, a selection of information identifying a particular one of the plurality of multimedia items;

providing, by the processor and for display via the first user device, a preview of the particular one of the plurality of multimedia items based on the selection;

receiving, by the processor and from the first user device, an annotation to the particular one of the plurality of multimedia items based on providing the preview of the particular one of the plurality of multimedia items for display via the first user device;

generating, by the processor and based on the annotation, an annotated multimedia item;

providing, by the processor and for display via the first user device, a preview of the annotated multimedia item;

receiving, by the processor and from the first user device, an input indicating one of:

an approval of the annotated multimedia item,
a rejection of the annotated multimedia item, or
a rejection of the annotation;

selectively enabling, by the processor, the first user device and the second user device to share the annotated multimedia item via the chat session, the processor enabling the first user device and the second user device to share the annotated multimedia item when the input indicates the approval of the annotated multimedia item, the information identifying the plurality of multimedia items being provided to the first user device when the input indicates the rejection of the annotated multimedia item, and the particular one of the plurality of multimedia items being provided to the first user device when the input indicates the rejection of the annotation;

receiving, by the processor, a rating associated with the annotated multimedia item;

determining, by the processor, that the rating associated with the annotated multimedia item exceeds a threshold; and storing, by the processor, the annotated multimedia item in a memory based on the rating associated with the annotated multimedia item exceeding the threshold.

6. The method of claim 5, where receiving the information identifying the plurality of attributes includes: receiving information identifying at least one of:

a description of a multimedia item,
a keyword associated with the multimedia item,
an author of the multimedia item,
a creation date associated with the multimedia item,
an access date associated with the multimedia item
a modification date associated with the multimedia,
a quantity of accesses associated with the multimedia item during a particular time period,
a rating associated with the multimedia item,
a size of the multimedia item, or
a file name associated with the multimedia item.

7. The method of claim 5, where comparing the plurality of attributes to the plurality of multimedia item attributes further comprises:

comparing, for each multimedia item, of the plurality of multimedia items, a particular attribute, of the plurality of attributes, to a multimedia item attribute associated with the multimedia item; and where providing the information identifying the plurality of multimedia items for display via the first user device includes:

providing, for display via the first user device, information identifying multimedia items, of the plurality of multimedia items, that include a multimedia item attribute that matches the particular attribute.

8. The method of claim 5, further comprising:

receiving an indication that the annotated multimedia item should be stored in a memory; and storing the annotated multimedia item in the memory based on the indication.

9. The method of claim 5, further comprising:
receiving a rating associated with the particular one of the plurality of multimedia items; and
updating an attribute associated with the particular one of the plurality of multimedia items based on the rating associated with the particular one of the plurality of multimedia items.

10. The method of claim 5, where receiving the information identifying the plurality of attributes includes: receiving information identifying at least one of:
a topic of the chat session,
an agent associated with the chat session,
a customer associated with the chat session, or
a type of device being used to participate in the chat session.

11. A non-transitory computer-readable medium storing instructions, the instructions comprising:
one or more instructions that, when executed by one or more processors, cause the one or more processors to:
initiate, between a first user device and a second user device, a chat session associated with a chat topic;
receive, from the first user device, information identifying a plurality of attributes associated with the chat topic;
compare the plurality of attributes to a plurality of multimedia item attributes associated with the plurality of multimedia items;
rank the plurality of multimedia items based on a quantity of the plurality of attributes that match the plurality of multimedia item attributes;
provide, from memory and for display via the first user device, information identifying multimedia items that each include an attribute, of the plurality of attributes, based on the ranking;
receive, from the first user device, a selection of information identifying a particular multimedia item of the multimedia items that each include the attribute;
provide, for display via the first user device, a preview of the particular multimedia item;
receive, from the first user device, an annotation to the particular multimedia item based on providing the preview of the particular multimedia item for display via the first user device;
generate, based on the annotation, an annotated multimedia item;
provide, for display via the first user device, a preview of the annotated multimedia item;
receive, from the first user device, an input indicating one of:
an approval of the annotated multimedia item,
a rejection of the annotated multimedia item, or
a rejection of the annotation;
selectively provide, for display via the first user device and the second user device, the annotated multimedia item via the chat session,
the annotated multimedia item being provided for display when the input indicates the approval of the annotated multimedia item,
the information identifying the multimedia items being provided to the first user device for another selection when the input indicates the rejection of the annotated multimedia item, and
the particular multimedia item being provided to the first user device when the input indicates the rejection of the annotation;

receive a rating associated with the annotated multimedia item;
determine that the rating associated with the annotated multimedia item exceeds a threshold; and
store the annotated multimedia item in a memory based on the rating associated with the annotated multimedia item exceeding the threshold.

12. The non-transitory computer-readable medium of claim 11, where the one or more instructions to receive the information identifying the plurality of attributes include:
one or more instructions that, when executed by the one or more processors, cause the one or more processors to:
receive information identifying at least one of:
a description of a multimedia item,
a keyword associated with the multimedia item,
an author of the multimedia item,
a creation date associated with the multimedia item,
an access date associated with the multimedia item
a modification date associated with the multimedia,
a quantity of accesses associated with the multimedia item during a particular time period,
a rating associated with the multimedia item,
a size of the multimedia item, or
a file name associated with the multimedia item.

13. The non-transitory computer-readable medium of claim 11, where the input comprises a first input, the instructions further comprising:
one or more instructions that, when executed by the one or more processors, cause the one or more processors to:
receive, from the first user device, a second input; and
provide, for display via the first user device and based on the second input, information associated with one or more of:
a customer associated with the second user device,
a history of the chat session,
a previous chat session associated with the customer, or
a series of actions performed by the customer prior to the chat session.

14. The non-transitory computer-readable medium of claim 11, where the information identifying the multimedia items includes information identifying an attribute associated with an agent associated with the chat session.

15. The non-transitory computer-readable medium of claim 11, where the particular multimedia item comprises a first multimedia item, the instructions further comprising:
one or more instructions that, when executed by the one or more processors, cause the one or more processors to:
receive, from the first user device and based on providing the information identifying the multimedia items for display via the first user device, a selection of information identifying a second multimedia item of the multimedia items;
provide, for display via the first user device, a preview of the second multimedia item;
receive, from the first user device, information indicating a rejection of the second multimedia item,
the preview of the particular multimedia item being provided for display via the first user device further based on the rejection of the second multimedia item.

16. The device of claim 1, where the one or more processors, when receiving the rating, are further to:
receive the rating from the customer device.

17. The device of claim 1, where the one or more processors, when receiving the rating, are further to:
receive the rating from the agent device.

18. The device of claim 1, where the rating is a first rating, where the one or more processors, when receiving the first rating, are further to:
receive the first rating from the agent device,
where the one or more processors are further to:
receive a second rating from the customer device, and
where the one or more processors, when storing the annotated multimedia item, are further to:
store the annotated multimedia item based on the first rating and the second rating.

19. The device of claim 18, where the one or more processors are further to:
apply different weights to the first rating and the second weighting, and
where the one or more processors, when storing the annotated multimedia item, are further to:
stored the annotated multimedia item based on the different weights applied to
the first rating and the second rating.

* * * * *